United States Patent
Takashima et al.

(10) Patent No.: US 10,177,912 B2
(45) Date of Patent: Jan. 8, 2019

(54) CONTENT INDIVIDUALIZATION

(71) Applicants: Sony Pictures Entertainment Inc., Culver City, CA (US); Sony Corporation, Tokyo (JP)

(72) Inventors: Yoshikazu Takashima, Los Angeles, CA (US); Christopher Taylor, Culver City, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 53 days.

(21) Appl. No.: 14/708,095

(22) Filed: May 8, 2015

(65) Prior Publication Data
US 2015/0326393 A1   Nov. 12, 2015

Related U.S. Application Data

(60) Provisional application No. 61/990,992, filed on May 9, 2014, provisional application No. 62/027,552, filed on Jul. 22, 2014, provisional application No. 62/093,917, filed on Dec. 18, 2014, provisional application No. 62/101,719, filed on Jan. 9, 2015, provisional application No. 62/149,261, filed on Apr. 17, 2015.

(51) Int. Cl.
| | |
|---|---|
| *H04L 9/14* | (2006.01) |
| *H04N 21/647* | (2011.01) |
| *H04N 21/4408* | (2011.01) |
| *H04N 21/8358* | (2011.01) |
| *H04N 21/845* | (2011.01) |

(52) U.S. Cl.
CPC ............ *H04L 9/14* (2013.01); *H04N 21/4408* (2013.01); *H04N 21/64715* (2013.01); *H04N 21/8358* (2013.01); *H04N 21/8456* (2013.01); *H04L 2209/24* (2013.01); *H04L 2209/608* (2013.01)

(58) Field of Classification Search
CPC ........ H04L 9/30; H04L 9/008; H04L 2209/24; H04L 9/3066; H04L 9/3093
See application file for complete search history.

(56) References Cited

U.S. PATENT DOCUMENTS

| | | | |
|---|---|---|---|
| 6,957,350 B1 * | 10/2005 | Demos | ................ H04N 5/14 348/E5.108 |
| 7,570,641 B2 | 8/2009 | Snyder | |
| 7,774,850 B2 | 8/2010 | Miles | |
| (Continued) | | | |

OTHER PUBLICATIONS http://www.aacsla.com/specifications/AACS_Spec_Prerecorded_Final_0.953.pdf, Oct. 26, 2012.*

*Primary Examiner* — Yonas A Bayou
(74) *Attorney, Agent, or Firm* — Procopio, Cory, Hargreaves & Savitch LLP

(57) ABSTRACT

Content individualization, including: encrypting a first part of a source data set using a first key creating a first encrypted data set; encrypting a second part of the source data set using a second key creating a second encrypted data set; encrypting the second part of the source data set using a third key creating a third encrypted data set; and combining the first encrypted data set, the second encrypted data set, and the third encrypted data set to form a final encrypted data set. Key words include watermarking and content individualization.

12 Claims, 33 Drawing Sheets

(56) References Cited

U.S. PATENT DOCUMENTS

| | | | |
|---|---|---|---|
| 7,801,308 B1* | 9/2010 | Hang | H04L 9/0822 |
| | | | 380/277 |
| 8,095,790 B2* | 1/2012 | Takashima | G06F 21/10 |
| | | | 380/277 |
| 8,527,750 B2 | 9/2013 | Swaminathan | |
| 8,532,286 B2* | 9/2013 | Lambert | G06F 7/728 |
| | | | 380/28 |
| 8,929,553 B2* | 1/2015 | Bauchot | H04L 9/0816 |
| | | | 380/278 |
| 9,520,993 B2* | 12/2016 | Jin | H04L 9/083 |
| 9,832,172 B2* | 11/2017 | Smith | H04L 63/0428 |
| 2002/0087818 A1* | 7/2002 | Ripley | G11B 20/00086 |
| | | | 711/164 |
| 2004/0109569 A1* | 6/2004 | Ellison | G11B 20/00086 |
| | | | 380/277 |
| 2005/0195975 A1* | 9/2005 | Kawakita | H04L 9/0822 |
| | | | 380/30 |
| 2008/0226077 A1* | 9/2008 | Kamibayashi | G11B 20/00086 |
| | | | 380/277 |
| 2010/0271914 A1* | 10/2010 | Talstra | G11B 20/00086 |
| | | | 369/47.15 |
| 2012/0173865 A1* | 7/2012 | Swaminathan | H04L 9/0637 |
| | | | 713/150 |

* cited by examiner

100

Logical Structure

File System Layer Structure    150

1600

Source (2B) 1610

2200

(2A without jump) 2210

2212

2214

2216

(2B without jump) 2220

2222

2224

2226

⟋⟋ Encryption with Key-1

⟍⟍ Encryption with Key-a

⊠ Encryption with Key-b

Local X/N Mbps

Continue X Mbps mux (but data size is smaller)

2630   Local average total rate <= 128 Mbps

2640   Local average total rate > 128 Mbps

CONTENT INDIVIDUALIZATION

CROSS-REFERENCE TO RELATED APPLICATIONS

This application claims the benefit of priority under 35 U.S.C. § 119(e) of: U.S. Provisional Patent Application No. 61/990,992, filed May 9, 2014, entitled "Content Individualization;" U.S. Provisional Patent Application No. 62/027,552, filed Jul. 22, 2014, entitled "Content Individualization;" U.S. Provisional Patent Application No. 62/093,917, filed Dec. 18, 2014, entitled "Content Individualization;" U.S. Provisional Patent Application No. 62/101,719, filed Jan. 9, 2015, entitled "Content Individualization;" and U.S. Provisional Patent Application No. 62/149,261, filed Apr. 17, 2015, entitled "Content Individualization." The disclosures of the above-referenced applications are incorporated herein by reference.

BACKGROUND

Field of the Invention

The present disclosure relates to content individualization, and more specifically, to individualizing the content using file formatting and encryption.

Background

The Advanced Access Content System (AACS) is a standard for content distribution and digital rights management, intended to restrict access to and copying of the post-DVD generation of optical discs. However, several AACS decryption keys have been extracted from software players and published on the Internet, allowing decryption by unlicensed software.

The AACS sequence key mechanism was developed to provide additional ways to restrict unlicensed use of the content. The sequence key mechanism uses seamless connection and branching with N different segments. The sequence key mechanism first assigns each player a unique set of sequence keys. Discs that use the mechanism contain a special header that a player can decode, using the sequence keys, to get a group of six decryption keys called the variant volume keys. When presented with the same disc, different player often ends up with different variant volume keys. The sequence key mechanism then takes a few clips of the content (e.g., a movie), and puts those clips on the disc several times, encrypted under different variant keys. The content provider creates N slightly different variants of the clips, and encrypts each variant under a different key. Thus, every player knows one of the N variant keys, so it is able to decrypt one of the variants. However, different players decrypt different variants.

The effect of applying the sequence key mechanism is that the content will look slightly different, depending on which player was used to decrypt it. If a ripped copy of the content is redistributed, the central authority can look at which variant of each clip is in the rip, and can then identify which player(s) did the ripping. Having identified a player or players, the authority can then blacklist its keys so the player will be unable to decrypt or play any new discs.

SUMMARY

The present disclosure provides for individualizing content using file formatting and encryption.

In one implementation, a method for content individualization is disclosed. The method includes: encrypting a first part of a source data set using a first key creating a first encrypted data set; encrypting a second part of the source data set using a second key creating a second encrypted data set; encrypting the second part of the source data set using a third key creating a third encrypted data set; and combining the first encrypted data set, the second encrypted data set, and the third encrypted data set to form a final encrypted data set.

In another implementation, a method of playing back individualized content on a playback device is disclosed. The method includes: reading a first part of an encrypted data set having first key information indicating a first key; decrypting the first part of the encrypted data set using a first playback key that is stored on the playback device and that matches the first key, creating first playback data; playing back the first playback data; reading a second part of an encrypted data set having second key information indicating a second key; reading a third part of an encrypted data set having third key information indicating a third key; selecting a second playback key that matches either the second key or the third key and that is stored on the playback device; decrypting the second part of the encrypted data using the second playback key, creating second playback data; and playing back the second playback data.

In another implementation, a method of reviewing individualized content is disclosed. The method includes: reading a first watermark from a first part of a playback data set; reading a second watermark from a second part of the playback data set; creating a target playback identifier based on the first watermark and the second watermark; accessing a device table, which includes a plurality of device records, wherein each device record of the plurality of device records includes a playback device identifier and a playback identifier; and selecting from the device table a playback device identifier that matches the target playback identifier.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As stated above, the sequence key mechanism uses seamless connection and branching with N different segments. However, this mechanism requires clip file separation and drive seek (or jump) to insert a forensic watermark which causes big capacity overhead for commercial title bitrate. For example, a forensic watermark can be inserted in the video data modification of one macroblock or one video frame level. However, duplicating larger clip data is not efficient. A faster drive seek time reduces the overhead, but still requires unnecessary duplication of data. Further, video watermarking process is not a straight forward process, because it requires video encoding, video analysis, preparation of segmented video files, and complex seamless connection title authoring.

Figure 1:
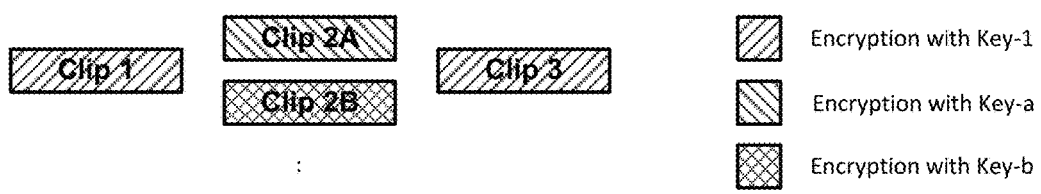
FIG. 1 shows a logical structure and a file system layer structure of a process for inserting forensic watermark into content data having at least three clips.
Figure 1:
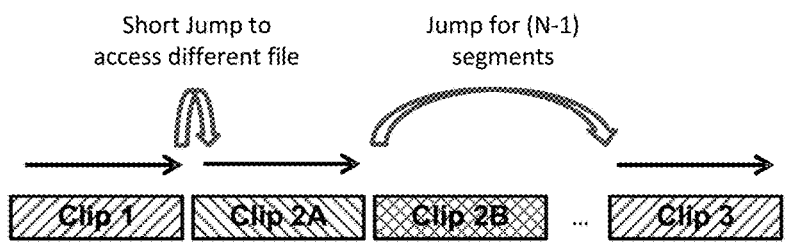

FIG. 1 shows a logical structure 100 and a file system layer structure 150 of a process for inserting forensic watermark into content data having at least three clips. As shown in the logical structure 100, clips 1 and 3 are encrypted with Key-1, while clip 2 is encrypted with Key-a and Key-b. Clip 2 encrypted with Key-A is labeled Clip 2A while clip 2 encrypted with Key-B is labeled Clip 2B. The encrypted clips are placed in sequence as an encrypted file and prepared for distribution (e.g., stored on an optical disc or in an online distribution storage server). As shown in the file system layer structure 150, the clip encrypted with Key-a (i.e., Clip 2A) and the clip encrypted with Key-b (i.e., Clip 2B) are placed next to each other, in sequence.

Certain implementations as disclosed herein teach techniques for content individualization using file formatting and encryption. In one implementation, the file formatting and encryption are defined for distribution systems, such as optical media delivery, electronic file download, and broadcasting. In one example, the optical media delivery includes forensic watermarking for video disks. Further implementations for content individualization include, but are not limited to, one or more of the following items: (1) Flexible selection of individualized segments of data; (2) Varying size of individualized segments; (3) Protecting data using combinations of keys; (4) Using one or more techniques to store duplicated data including: (a) inserting duplicate data into a stream after video authoring; (b) inserting duplicate data into a stream during video authoring and updating the stream after video authoring; (c) storing duplicate data as metadata to be read during playback; (d) preparing duplicate data as metadata and multiplexing into a stream; (5) Conversion, such as conversion from "frame base" to "fixed-size packet" and from "fixed-size packet" to "frame base", with or without "decryption and re-encryption process"; (6) Including separately prepared video variations in the conversion output file format header files; and (7) Performing individualized segment filtering.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

A provider, such as a content provider or distribution service provider, may employ several different options to individualize content playback to trace how content has been distributed and played. In one implementation, the individualization may be achieved by utilizing a watermark inserted into video and/or audio signal, for example. In one case in which the provider trusts the playback device, the device inserts individual identifiers (IDs) into the output video/audio signal. In another case in which the provider does not trust the playback device (e.g. when the provider is trying to identify a compromised playback device which was used to make an illegal copy of the content), the content is individualized before the playback occurs.

To provide better performance for overall individualization and tracing capability, following features may be employed. For example, individualized segments are selected so that the watermarking technology can apply a more sophisticated approach to select location(s) for watermarking. In another example, a smaller size of individualized segments is enabled so that the data size overhead for individualization is kept smaller. Further, in case the individualization data (different video/audio variations) is to be distributed together (e.g. Physical media delivery), the individualization data is protected by a combination of keys given to a specific client so that the client can playback only the specific segments for which it is authorized. Other segments are cryptographically protected by different keys.

In some implementations, individualization may also reflect various factors involved in the content distribution and playback chain. For example, the various factors include: service provider or distributor identification; user account or other means of content purchase record; playback device information such as model, firmware/software versions, operating system, serial number, etc.; and playback environments such as output interface (Digital output port, network streaming inside home, etc.), information of other devices receiving same content from the playback source device, etc. In another implementation, the watermarking unit (e.g. video frame, audio frame, or specific length of A/V data) is the same, and the same technique is applied for individualization regardless of the actual watermarking technology choice.

In one example implementation, a content file is a video file including video data. The video data is divided into frames (literally and/or logically). A service provider computer system encrypts the video data on a frame-by-frame basis using multiple keys. Each frame of data is encrypted. In this example implementation, the source system encrypts 75% of the frames using a first key (Key A). The remaining frames are encrypted two times, once with a second key (Key B) and once with a third key (Key C). After encryption, there are more encrypted frames than source frames. For example, if the source file had 100 frames, 75 frames would be encrypted using Key A, 25 frames would be encrypted using Key B, and 25 frames would be encrypted using Key C, for a total of 125 encrypted frames. The encrypted frames are placed in sequence as an encrypted video file and prepared for distribution (e.g., stored to an optical disc or in an online distribution storage server). The frames encrypted with Key B and the frames encrypted with Key C are placed next to each other, in sequence. For example, frame 1 encrypted with Key A is placed in a first position, frame 2 encrypted with Key B is placed next in sequence in a second position, frame 2 encrypted with Key C is placed next in sequence in a third position, and frame 3 encrypted with Key A is placed next in sequence in a fourth position.

During playback, the playback device has Key A and either Key B or Key C. The playback device decrypts and plays the frames matching the keys that it has. For example, a playback device having Key A and Key B will decrypt and playback the frames encrypted with Keys A and B, but not the frames encrypted using Key C.

Other implementations can use different ratios of encryption and numbers of keys. For example, in one implementation, the source system uses five keys. The source system encrypts 90% of the frames using one key and then encrypts the remaining 10% of the frames using the other four keys. In another example, the source system uses 11 keys. The source system encrypts 50% of the frames using one key. The source system encrypts 10% of the frames using two keys, another 10% of the frames using two different keys, and so on. For example, if the source file had 100 frames, 50 frames would be encrypted using the first key, and 10 frames would be encrypted using each of the other 10 keys (150 encrypted frames total). Frames 1-5 are encrypted using Key 1. Frame 6 is encrypted using Key 2 and Key 3; frame 7 is encrypted using Key 4 and Key 5; frame 8 is encrypted using Key 6 and Key 7; frame 9 is encrypted using Key 8 and Key 9; frame 10 is encrypted using Key 10 and Key 11. A playback device for this source file has six keys, the first key and one of each of the key pairs (e.g., Key 1, Key 2, Key 4, Key 6, Key 8, and Key 10). In another example, a frame may be encrypted using more than one key together. For example, a frame may be encrypted using a first key and then the encrypted frame encrypted again using a second key.

Other implementations can also use different storage units instead of frames. In one example, a source system encrypts groups of frames. In another example, a source system encrypts packets or groups of packets. Combinations of units can also be used (e.g., encrypting groups of frames using one key and encrypting packets with other keys).

Some or all of the frames can be watermarked (e.g., a digital watermark embedded in the data for a frame, or otherwise marked). The watermarks can be used to help to identify a playback stream. The playback stream for a device can indicate which combination of frames the playback device decrypted. For example, if a frame encrypted with Key X has Watermark X (e.g., Watermark X was inserted into the frame before encryption) and the same frame encrypted with Key Y has Watermark Y, then if the playback stream includes Watermark X, the playback device had Key X but not Key Y. Using combinations of keys, frame sequences, and watermarks, a playback stream can indicate a specific player.

In one example, each playback device is given a unique set of keys which will lead to a unique playback stream. The combination of marks in the playback stream (data) forms a playback identifier or fingerprint as a sequence of marks or keys (or, e.g., an identifier can be derived from the marks).

A table of key distributions (fingerprints) and playback devices (and similar information for frame sequences, watermarks, key encryptions) is maintained by the source system (or another entity). Comparing the playback sequence fingerprint with the tables will indicate which playback device created the playback stream.

Different combinations of frames will use different amounts of storage in the encrypted file (including more encrypted frames will create a bigger file) and more keys can also require more overhead and distribution. However, one benefit can be to create a common file that can be distributed widely and still create an individualized playback output.

In another implementation, additional functionality can be included for devices and/or software which are already capable of playing non-individualized content. In one example, device process burden is mitigated to handle instant peak bitrate increase where individualized content data is used. In another example, the content preparation specification is defined to guarantee continuous playback when individualized content makes the total data rate higher than the data rate the system is originally designed to process. In another example, parameters are controlled so that overall playback system performance can guarantee continuous playback.

In some implementations, content individualization is adapted to existing systems (e.g., Blu-ray Player and Blu-ray Disc authoring systems), without requiring large design change to the system. Several examples are described below to keep the same or similar model applicable to difficult cases, then provide playback for easier cases.

The same approach can also be applied to systems which have existing built-in capability at data source supply speed, and data process speed for non-individualized content, and adapted for individualization.

Figure 2:
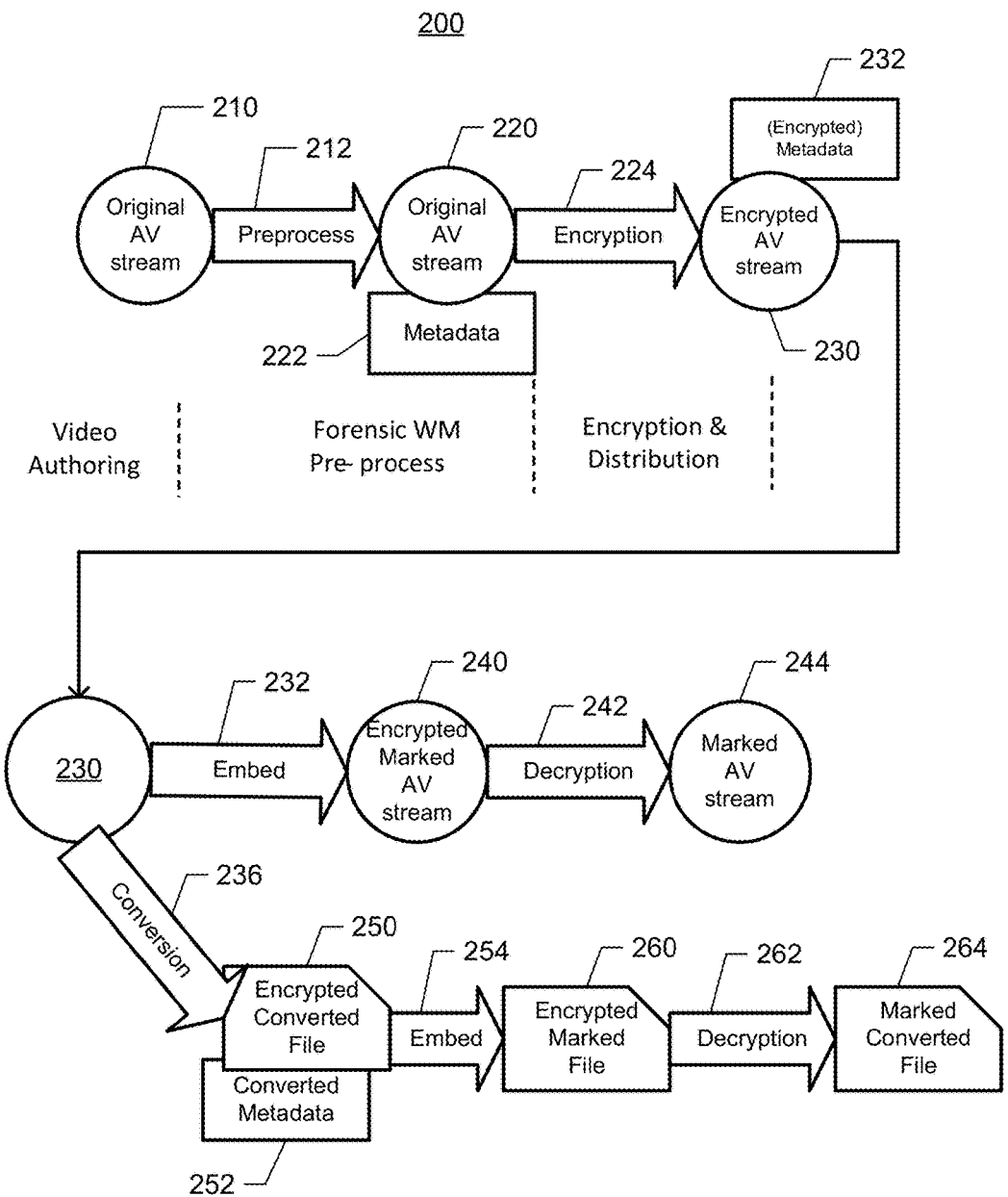
FIG. 2 is a work flow diagram of a forensic watermarking (WM) tool in accordance with one implementation of the present disclosure.

FIG. 2 is a work flow diagram 200 of a forensic watermarking (WM) tool in accordance with one implementation of the present disclosure. Video authoring using the WM tool includes preparing audio/video (AV) stream file 210 (e.g., Moving Picture Experts Group transport stream (MPEG-TS) file or MPEG-4 file), running a pre-process tool 212, and generating the AV stream 220 and associated metadata 222 in a post-authoring process. Encryption 224 is performed on the AV stream 220 and the metadata 222 to generate encrypted AV stream 230 and metadata 232. An embedding tool 232 or 254 is then run (either at the server or client) to apply forensic WM into the AV stream file 230. Running of the embedding tool 232 results in an encrypted marked AV stream file 240 and the decryption tool 242 results in a marked AV stream file 244. Embedding can be applied to encrypted AV stream or plain text AV stream. The embedding process modifies the video data to embed one to N-bit payload.

Prior to the embedding process, a conversion tool 236 may be run on the encrypted AV stream. The conversion 236 may or may not involve decryption of the original encrypted AV stream. The conversion 236 may re-use video/audio data from the original encrypted AV stream, use new video/audio data, or mix the original and the new data. The conversion 236 generates converted file 250 and metadata 252, which may be different from the original encrypted metadata to accommodate different file format and/or to use different forensic WM information after conversion. The embedding process 254 results in marked file 260. Subsequent decryption 262 generates the marked converted file 264.

FIGS. 3 through 7 show additional implementations and details describing several techniques for handling duplicate data, how to embed or interact with AV streams, and handling individualized segments.

Figure 3:
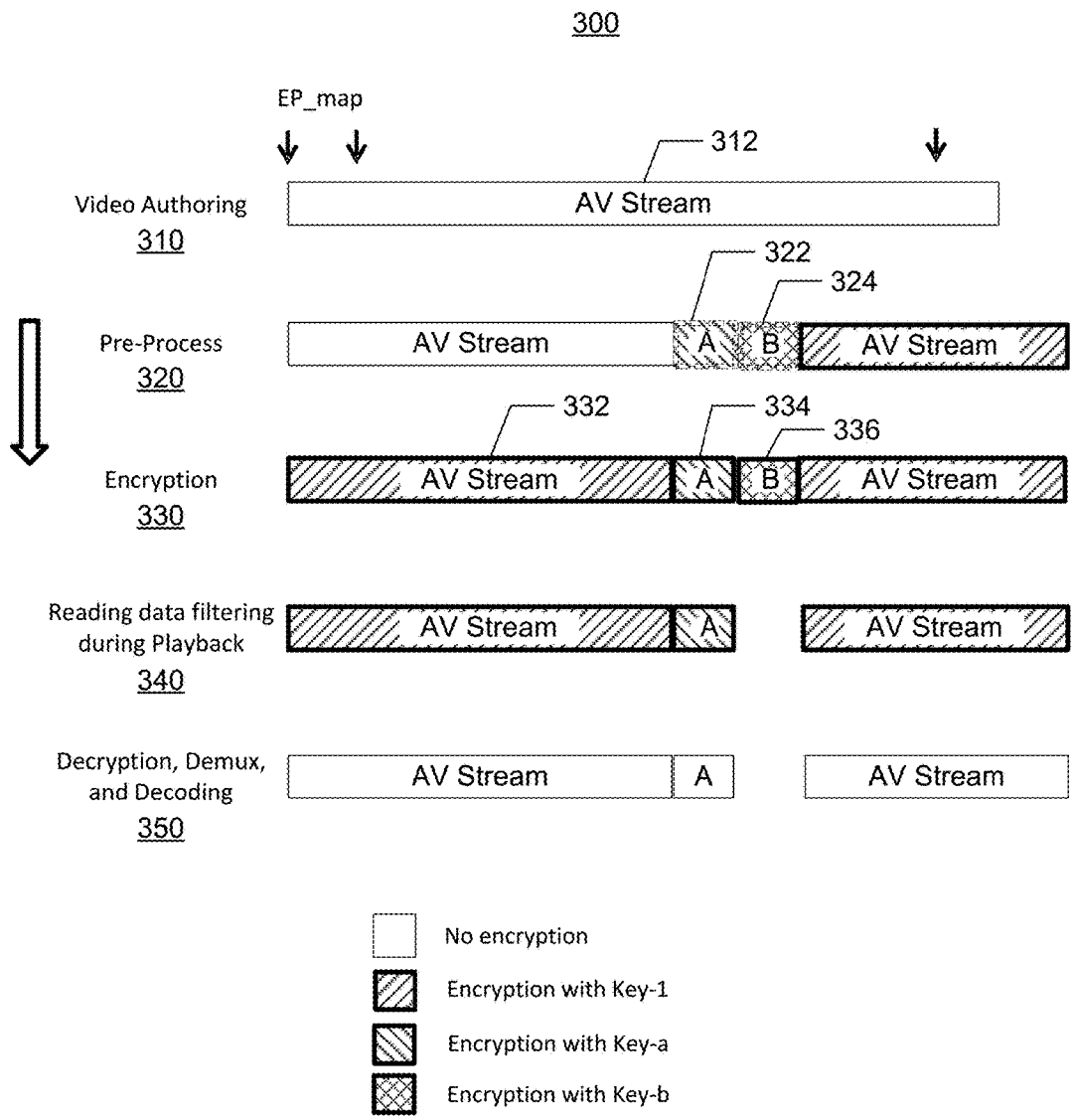
FIG. 3 is a work flow diagram for an embedding and playback process in accordance with one implementation of the present disclosure.

FIG. 3 is a work flow diagram for an embedding and playback process 300 in accordance with one implementation of the present disclosure. In the illustrated implementation of FIG. 3, the process 300 includes no jumps, but duplicated data is inserted into the AV stream 312 after a video authoring process 310. In particular, a forensic WM pre-process tool 320 is run against a video image and multiple watermarked video data are inserted into AV stream, which increases the size of the AV stream file. In FIG. 3, the AV stream 332 is encrypted with Key-1, video data A 334 is encrypted with Key-A, and video data B 336 is encrypted with Key-B.

The process 300 may also include an encryption process 330. If 6 KB block encryption is used, this insertion is done at 6 KB block boundary, and duplication includes video and non-video transport stream (TS) packets. If video elementary stream layer encryption is used, this duplication is applied to video TS packets only. In this case, the TS layer needs to have an indication to identify which version of the video data each TS packet is carrying (e.g. different TS packet identifier, different flags in transport layer, external table with location of duplicated TS packets, etc.). The reading data filtering is performed, at step 340, during playback, and the AV stream is decrypted, at step 350. Since the video database (EP_map) does not match the final AV Stream file, the database needs to be updated, or an EP_map to final AV stream mapping table needs to be provided.

Figure 4:
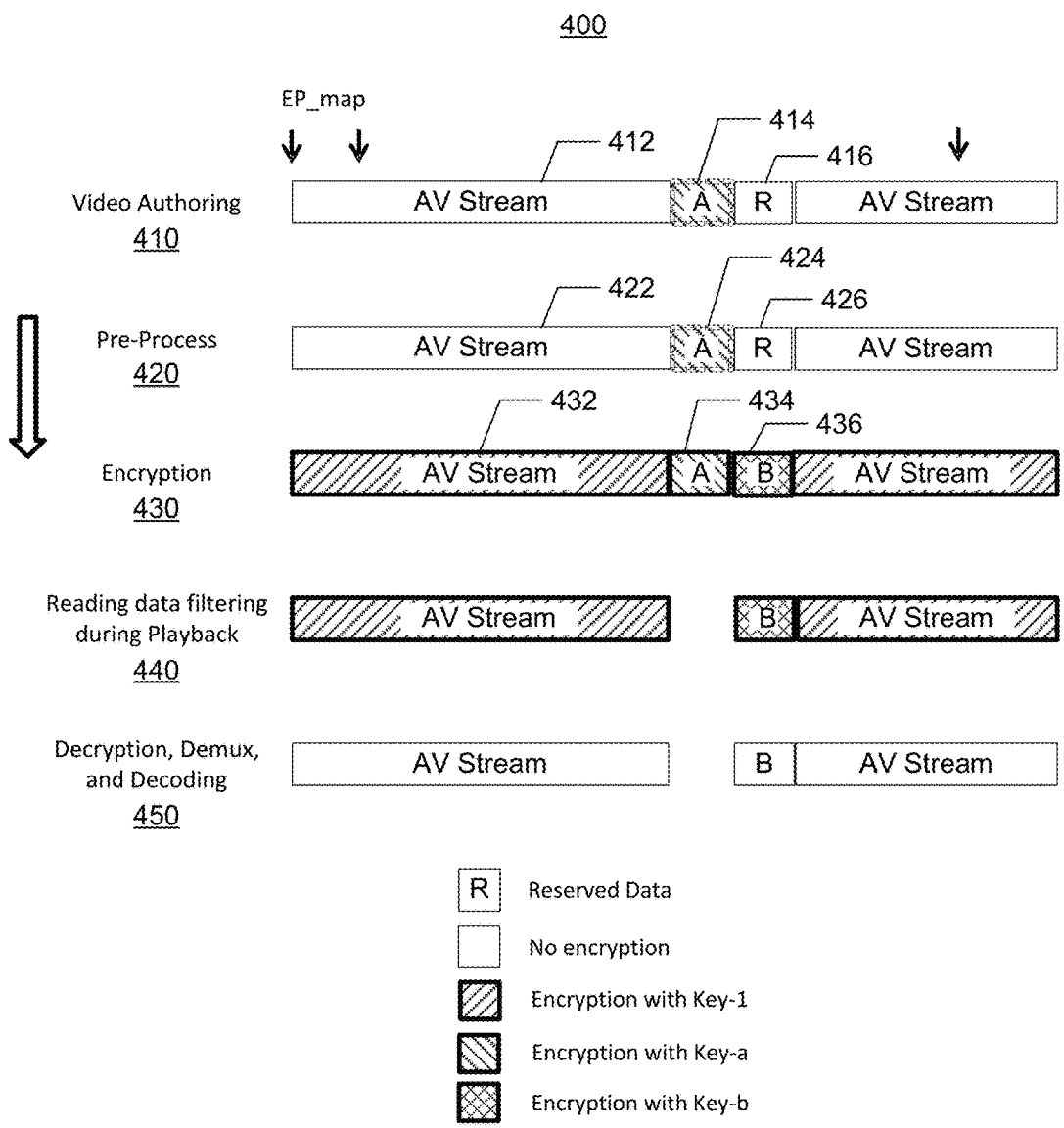
FIG. 4 is a work flow diagram for an embedding and playback process in accordance with another implementation of the present disclosure.

FIG. 4 is a work flow diagram for an embedding and playback process 400 in accordance with another implementation of the present disclosure. In the illustrated implementation of FIG. 4, the process 400 includes no jumps, but the duplicated data area 414, 416 is inserted into the AV stream 412 during a video authoring process 410, and is updated with the duplicated video data after the video authoring process 410. Video authoring also includes a reserved area 416 for the duplicated video data inside the AV stream 412. After the video authoring process 410, a forensic WM pre-process tool 420 is run against a video image and multiple watermarked video data 424, 426 are inserted into the AV stream 422 using reserved area 426. The AV stream file size and the original video group of pictures (GOP) start point remain the same.

The process 400 may also include an encryption process 430, which is applied with different keys to the location of variants. In FIG. 4, the AV stream 432 is encrypted with Key-1, video data A 434 is encrypted with Key-A, and video data B 436 is encrypted with Key-B. If 6 KB block encryption is used, the reserved data is prepared keeping 6 KB boundary. If video elementary stream layer encryption is used, the reserved data is prepared for video frames only. Overhead size is managed by adjusting the amount of reserved data. Reserved data is originally authored to be ignored by player (e.g. different TS PID, etc.). The reading data filtering is performed, at step 440, during playback, and the AV stream is decrypted, at step 450. The video database (EP_map) matches the final AV stream file.

Figure 5:
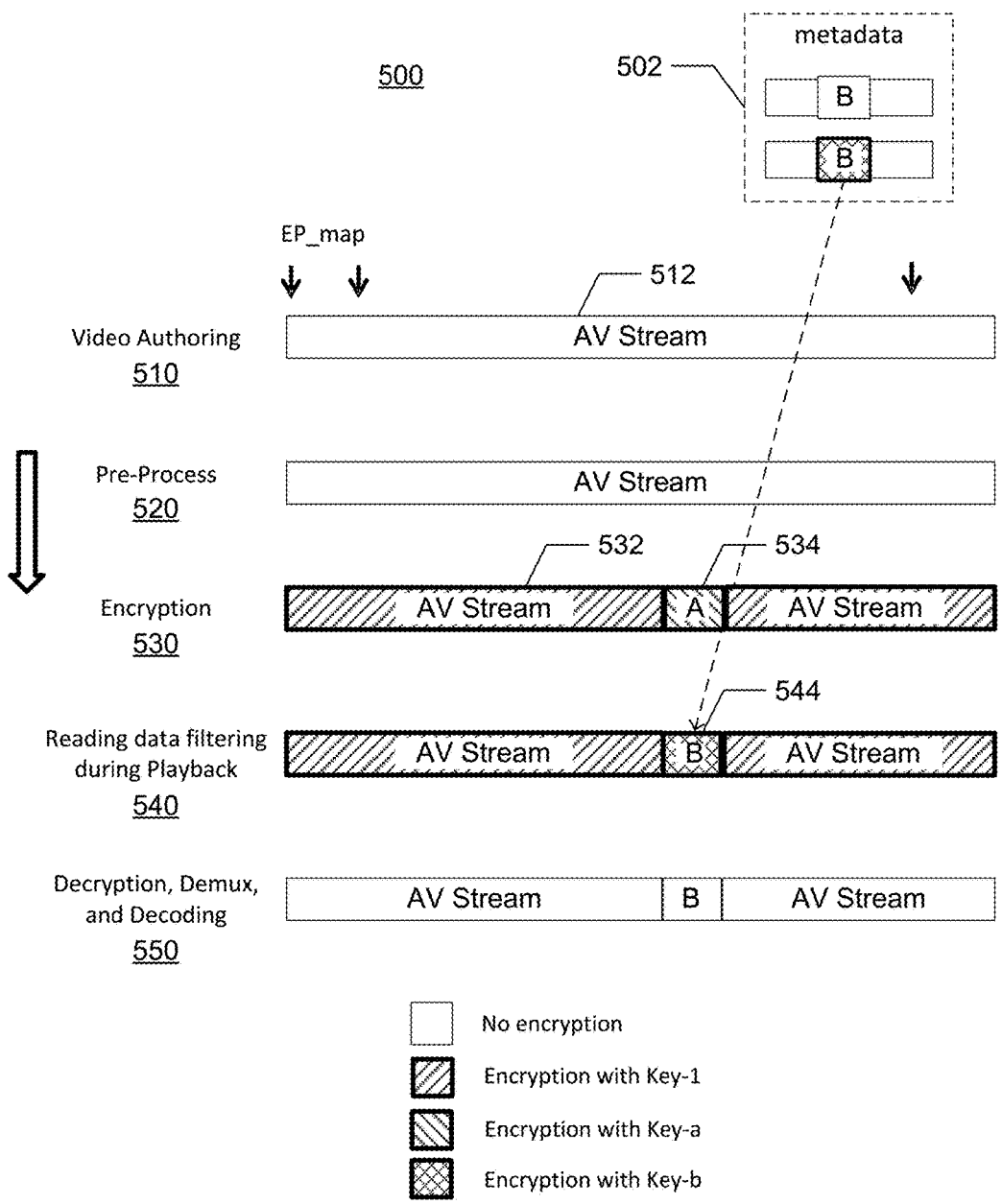
FIG. 5 is a work flow diagram for an embedding and playback process in accordance with another implementation of the present disclosure.

FIG. 5 is a work flow diagram for an embedding and playback process 500 in accordance with another implementation of the present disclosure. In the illustrated implementation of FIG. 5, the process 500 includes no jumps, but the duplicated data is stored as separate metadata 502, while the useable default version is also kept in the AV stream 512. After the video authoring process 510, a forensic WM pre-process tool 520 is run against a video image. The forensic WM pre-process tool 520 also generates separate metadata, but the AV stream file size remains the same. If the video authoring process 510 prepares metadata dummy file, the file system layer can be maintained by updating the metadata dummy file without changing the file allocation.

The process 500 may also include an encryption process 530, a process 540 for reading data filtering during playback, and a process 550 for decryption. In FIG. 5, one version of the video data (video data A 534) is included in the AV stream 532 and encrypted with a first segment key (key-a), while the other version of the video data (video data B 544) is included in the metadata 502 and encrypted with a second segment key (key-b). Each of block A 534 and B 544 has an identifier to be used by the player to select a key for the corresponding block. If 6 KB block encryption is used, the metadata is prepared to replace target 6 KB blocks. If video elementary stream layer encryption is used, the metadata is prepared to replace one of: TS packets; video frame; byte sequences (i.e., offset and length) in MPEG TS layer; or byte sequences in a video frame layer. The video database (EP_map) matches the final AV stream file. In this implementation, the player needs to read the metadata file during the playback or before the playback starts (and cache the data that the player will actually use).

Figure 6:
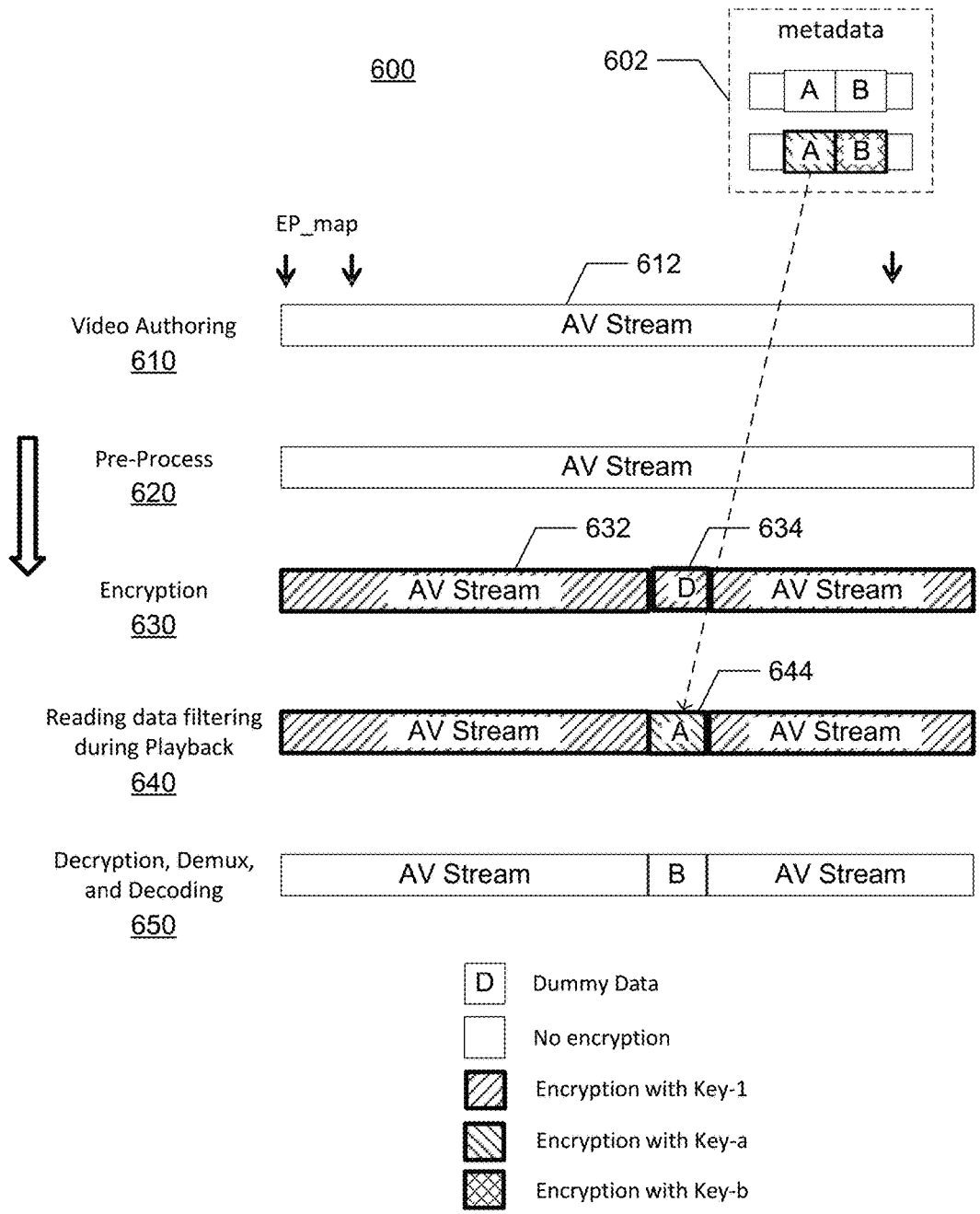
FIG. 6 is a work flow diagram for an embedding and playback process in accordance with another implementation of the present disclosure.

FIG. 6 is a work flow diagram for an embedding and playback process 600 in accordance with another implementation of the present disclosure. In the illustrated implementation of FIG. 6, the process 600 includes no jumps, but the duplicated data is stored as separate metadata 602, while the dummy data 634 is also kept in the AV stream 632. After the video authoring process 610, a forensic WM pre-process tool 620 is run against a video image. The forensic WM pre-process tool 620 also generates separate metadata, but the AV stream file size remains the same. If the video authoring process 610 prepares metadata dummy file, the file system layer can be maintained by updating the metadata dummy file without changing the file allocation.

The process 600 may also include an encryption process 630, a process 640 for reading data filtering during playback, and a process 650 for decryption. In FIG. 6, both versions of the video data are stored in the metadata 602. The AV stream file 632 is encrypted with Key-1 and includes unusable video data 634 to keep the AV stream file size unchanged. Each of the multiple versions of the video in the metadata 602 is encrypted by unique keys (Key-a and Key-b) and has an identifier to be used by the player to select a key for that block. If 6 KB block encryption is used, the metadata is prepared to replace target 6 KB blocks. If video elementary stream layer encryption is used, the metadata is prepared to replace one of: TS packets; video frame; byte sequences (i.e., offset and length) in MPEG TS layer; or byte sequences in a video frame layer. The video database (EP_map) matches the final AV stream file. In this implementation, the player needs to read the metadata file during the playback or before the playback starts (and cache the data that the player will actually use). The player discards the unusable data 634 in the AV stream and uses alternative data 644 from the metadata.

Figure 7:
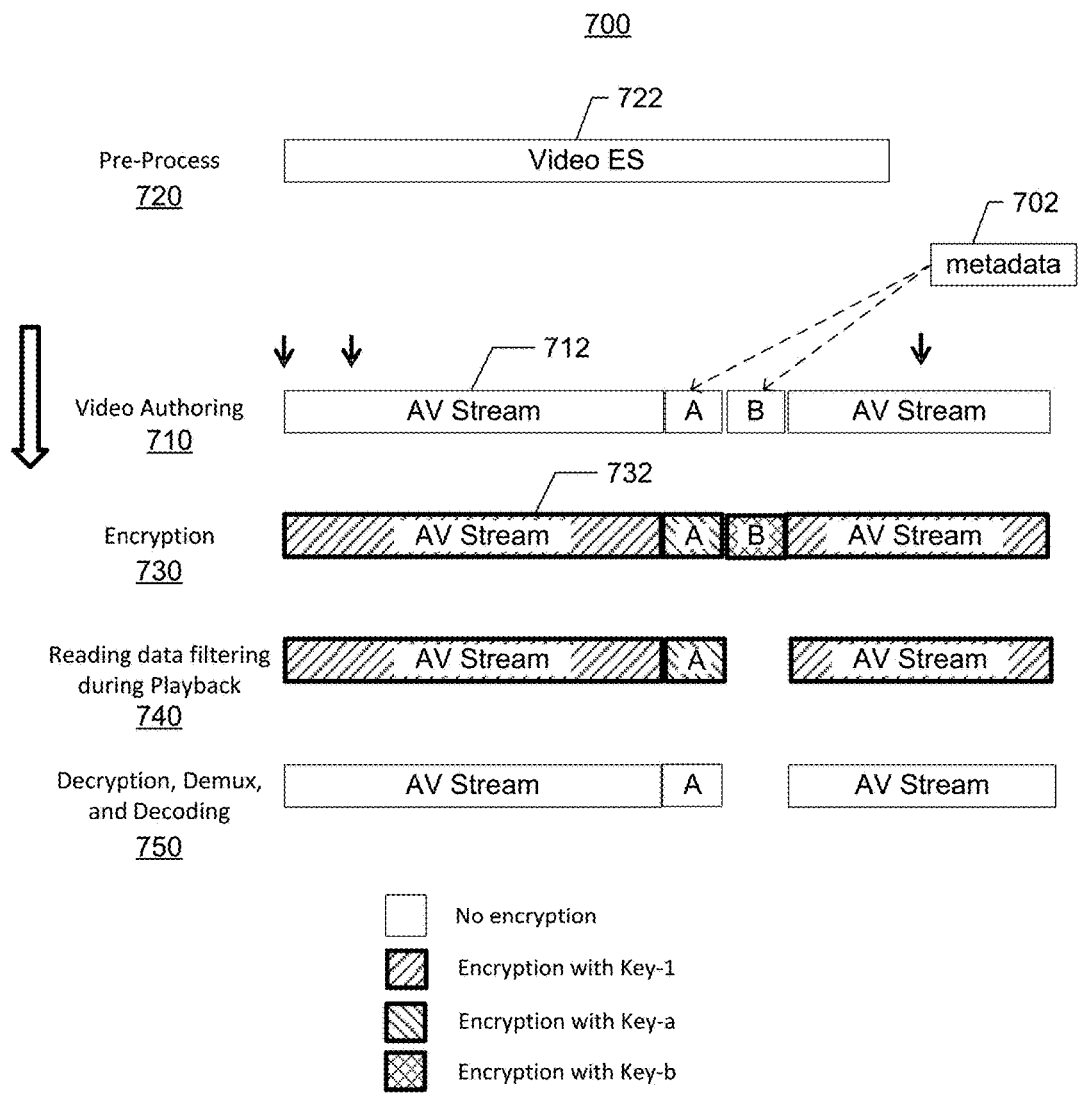
FIG. 7 is a work flow diagram for an embedding and playback process in accordance with yet another implementation of the present disclosure.

FIG. 7 is a work flow diagram for an embedding and playback process 700 in accordance with yet another implementation of the present disclosure. In the illustrated implementation of FIG. 7, the process 700 includes video authoring 710, pre-processing 720, encryption 730, reading data filtering during playback 740, and decryption 750. The process 700 includes no jumps, but the metadata 702 is prepared before the video authoring 710, and the metadata 702 is multiplexed into the AV stream 712. The video authoring 710 multiplexes the metadata 702 similar to a secondary video, but only for the video locations where the forensic WM tool can be used. The forensic WM tool is run against the video elementary stream (ES) data 722, and the metadata 702 is created. The metadata 702 includes a frame number and associated data for the forensic WM.

The process 700 may also include an encryption process 730, a process 740 for reading data filtering during playback, and a process 750 for decryption. In FIG. 7, the AV stream file 732 is encrypted with Key-1. The multiple video versions are encrypted with different keys (key-a, key-b). The block identifier is used by the player to select a key for that block. If 6 KB block encryption is used, the metadata will be used to create alternative 6 KB blocks. If the Video ES layer encryption is used, metadata is used to create alternative video frames. The video database (EP_map) matches the final AV stream file. In this implementation, the player parses the identifier in the AV stream to drop the segment for which the player does not have a decryption key. If a separate key mapping table is provided, that table is used.

FIGS. 8 through 21 illustrate various media formats and conversions such as conversion from "frame base" to "fixed packet size" and from "fixed packet size" to "frame base", with or without "decryption and re-encryption process".

Figure 8:
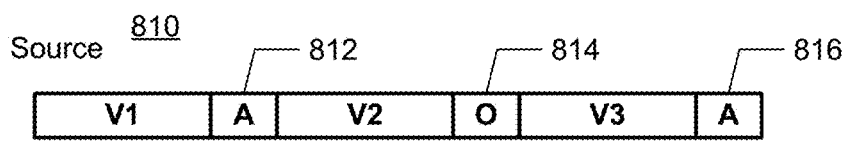
FIG. 8 is an illustration of a media format (with multiplexed video, audio, and other data units) in a frame base in accordance with one implementation.
Figure 8:
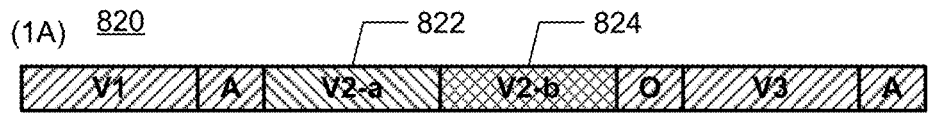
Figure 8:
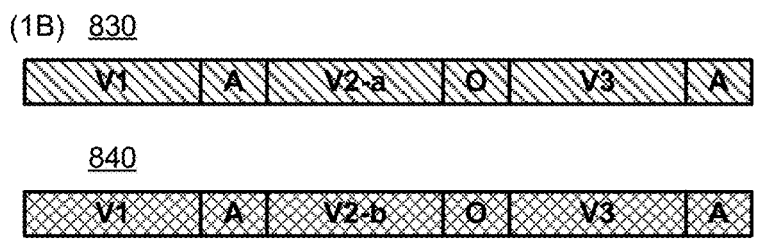

FIG. 8 is an illustration 800 of a media format (with multiplexed video, audio, and other data units) in a frame base in accordance with one implementation. The multiplexing is applied by video/audio frame basis or larger block such as a video group of pictures (GOP) (e.g., an MPEG-4 (MP4) format or Common File Format (CFF)). In this implementation, the individualization can be applied by frame basis (or larger units).

Source frames in elementary stream (ES) 810 include three video data units V1, V2, V3, two audio units 812, 816, and one other data unit 814. Frames in ES 820 (stream 1A) include two V2 frames 822, 824 (frames V2-a, V2-b) encrypted with Key-a and Key-b, respectively. In case encryption is also applied by frame basis, encryption does not affect selection of individualization segment. In stream 1A 820, the player needs to choose frame V2-a or V2-b based on the matching with a given key. For example, a player which received Key-a decrypts and plays frame V2-a. In stream 1B, frames in ES 830 overlap with frames in ES 840. Thus, in stream 1B, the selection of individualization segment can be done at the unit of one or more encryption block. The player will need to choose encryption block based on the matching with a given key. Thus, these blocks can exist in one file, or can be stored as separate files and played continuously. The player which received Key-a decrypts the block which includes V2-a, while the player which receive Key-b decrypts the block which includes V2-b.

Regarding FIG. 8, although the illustration 800 is based on a frame-based video watermarking, other means such as longer length video marking or audio watermarking can be applied through the same segmentation approach. The multiplexing layer (such as MP4 header and other container format layer) is omitted to simplify the illustration 800. Further, frames V2-a and V2-b may have different video watermark inserted. Thus, the payload for storing information can be provided by having multiple segments individualized across the entire content sequence.

Figure 9:
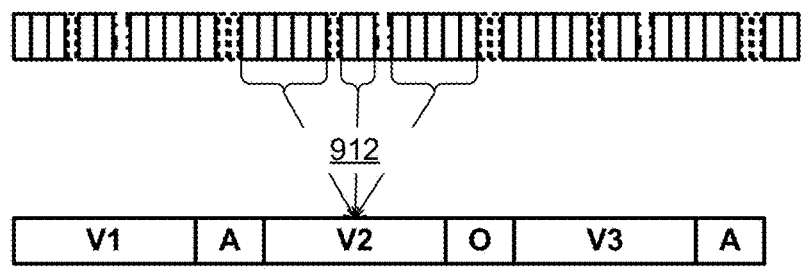
FIG. 9 is an illustration of a media format (with multiplexed video, audio, and other data units) in a fixed-size packet in accordance with one implementation.
Figure 9:
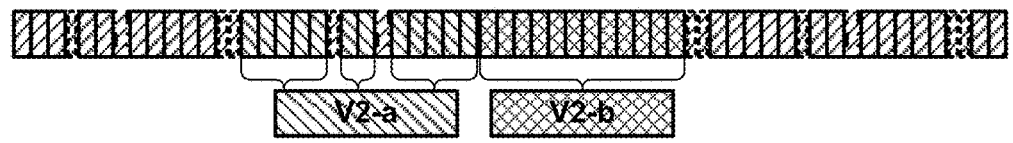
Figure 9:

FIG. 9 is an illustration 900 of a media format (with multiplexed video, audio, and other data units) in a fixed-size packet in accordance with one implementation. Source ES 910 includes a stream of fixed-size packets with data units stored in multiple packets. For example, video data unit V2 is stored in multiple packets 912. In this implementation, the individualization can be applied by frame basis (or larger units), but consideration for the fixed-size packet sequence is needed.

The multiplexing is applied in a fixed-sized packet (e.g., an MPEG Transport stream (MPEG-TS) based broadcasting in Blu-ray Disc Format). In a case in which encryption is also applied on a frame basis (e.g., stream 2A), encryption does not affect selection of the individualization segment. In stream 2A 920, the player needs to choose frame V2-*a* or V2-*b* based on the matching with a given key. For example, a player which received Key-*a* decrypts and plays frame V2-*a*. The order of packets encrypted by Key-*a* and Key-*b* is flexible (see stream 930). Thus, the order can be mixed as far as decryption is applied in a video frame layer (not at a transport packet layer). In a case (see stream 2B in FIG. 16) in which an encryption unit overlaps with different types of elementary streams, the selection of individualization segment can be done at the unit of one or more encryption block.

Regarding FIG. 9, although the illustration 900 is based on a frame-based video watermarking, other means such as longer length video marking or audio watermarking can be applied through the same segmentation approach. The multiplexing layer (such as MPEG-TS header and other container format layer) is omitted to simplify the illustration 900. Further, frames V2-*a* and V2-*b* may have different video watermark inserted. Thus, the payload for storing information can be provided by having multiple segments individualized across the entire content sequence.

Figure 10:
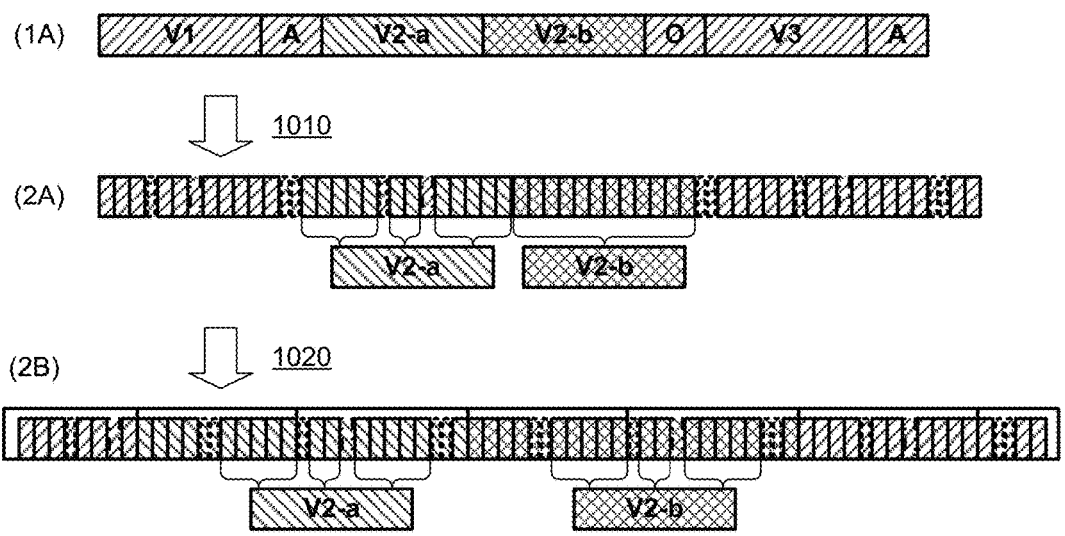
FIG. 10 is an illustration of a process for converting from "frame base" to "fixed-size packet" by re-using all of the same video data included in the original stream (i.e., stream 1A)

FIG. 10 is an illustration of a process 1000 for converting from "frame base" to "fixed-size packet" by re-using all of the same video data included in the original stream (i.e., stream 1A). In a conversion case 1010 from stream 1A to stream 2A, the original variation of the video data is re-used. In this case 1010, the video data is re-multiplexed from the "frame base" format (e.g. MP4) to the "fixed-size packet" format (e.g. MPEG-TS), while preserving the encryption. The audio data and other data are also re-multiplexed into the "fixed-size packet" format in the same manner.

In another conversion case 1020 from stream 1A to stream 2B, the original variation of the video data is also re-used. In this case 1020, the video data is decrypted and re-multiplexed from the "frame base" format (e.g. MP4) to the "fixed-size packet" format (e.g. MPEG-TS). The encryption is applied to a series of fixed-size packets (e.g., 32 packets with 192 bytes each (6144 bytes total) form an encryption block).

Figure 11:
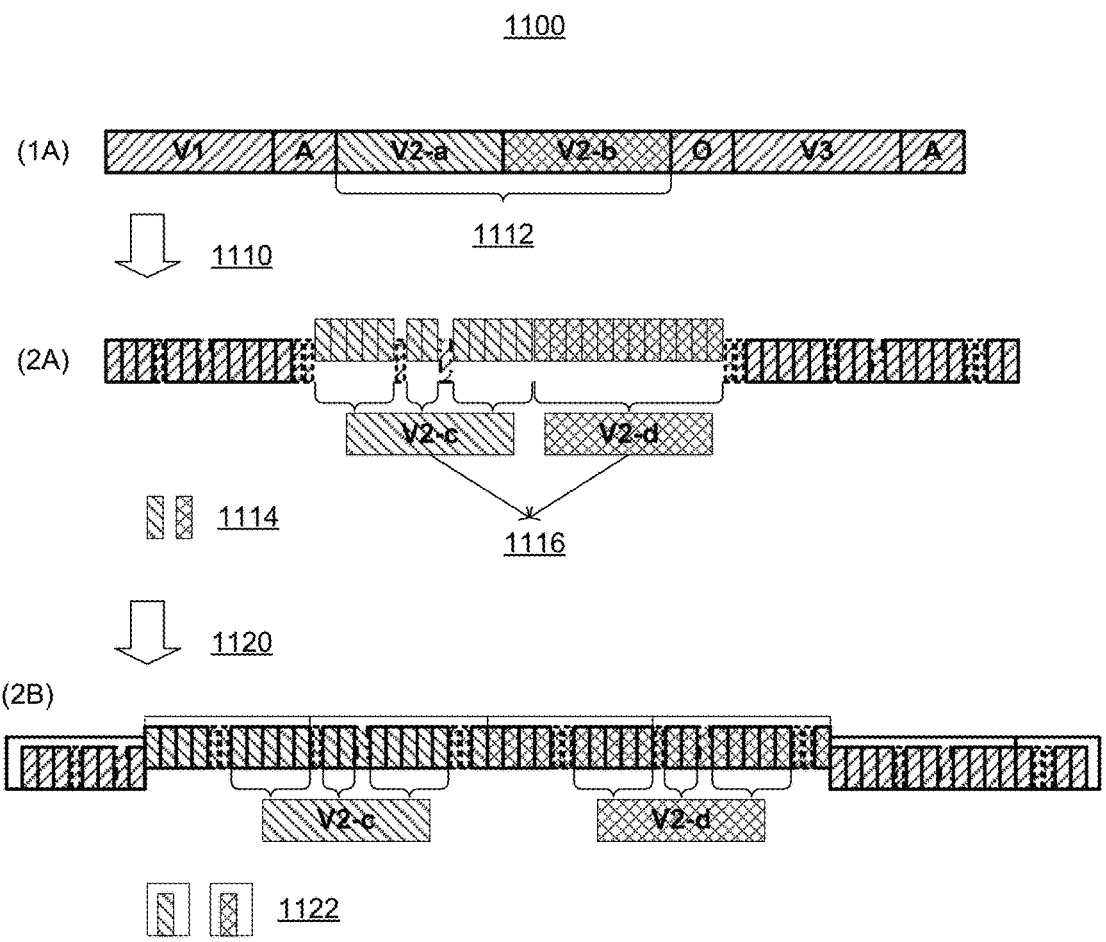
FIG. 11 is an illustration of a process for converting from "frame base" to "fixed-size packet" by providing alternative data for the use after the conversion.

FIG. 11 is an illustration of a process 1100 for converting from "frame base" to "fixed-size packet" by providing alternative data for the use after the conversion. The conversion case 1110 is a conversion from stream 1A to stream 2A, while case 1120 is a conversion from stream 1A to stream 2B. In either case 1110 or 1120, the original variation of the video data is discarded and the separately-prepared already-encrypted video data is used. The content author prepares V2-*c* and V2-*d* portion of the data format (stream 2A or 2B) separately from the original format stream (stream 1A), and provides V2-*c* and V2-*d* portions of the data as a separate file on the media or from the server. As stated above, in either case 1110 or 1120, the conversion process discards V2-*a* and V2-*b* portions from original video data (see 1112), and inserts V2-*c* and V2-*d* data as replacements (see 1116). Packets 1114 make up separately prepared encrypted video variations (video ES encrypted in fixed-size packets). Blocks 1122 make up separately prepared encrypted blocks (including video variations). Data V2-*c* or V2-*d* may or may not be the same video data as V2-*a*/V2-*b*, and may or may not be encrypted with same keys as V2-*a*/V2-*b*. The playback license for data format (2A)/(2B) may provide different set of keys compared to the keys used for data format (1A). By providing already encrypted separate variation data for data format (2A)/(2B), the conversion process does not need to expose the video data of V2-*a*/V2-*b* and can maintain the uniqueness of a forensic WM identifier in the decrypted image which was associated with the set of keys given to a particular player.

Figure 12:
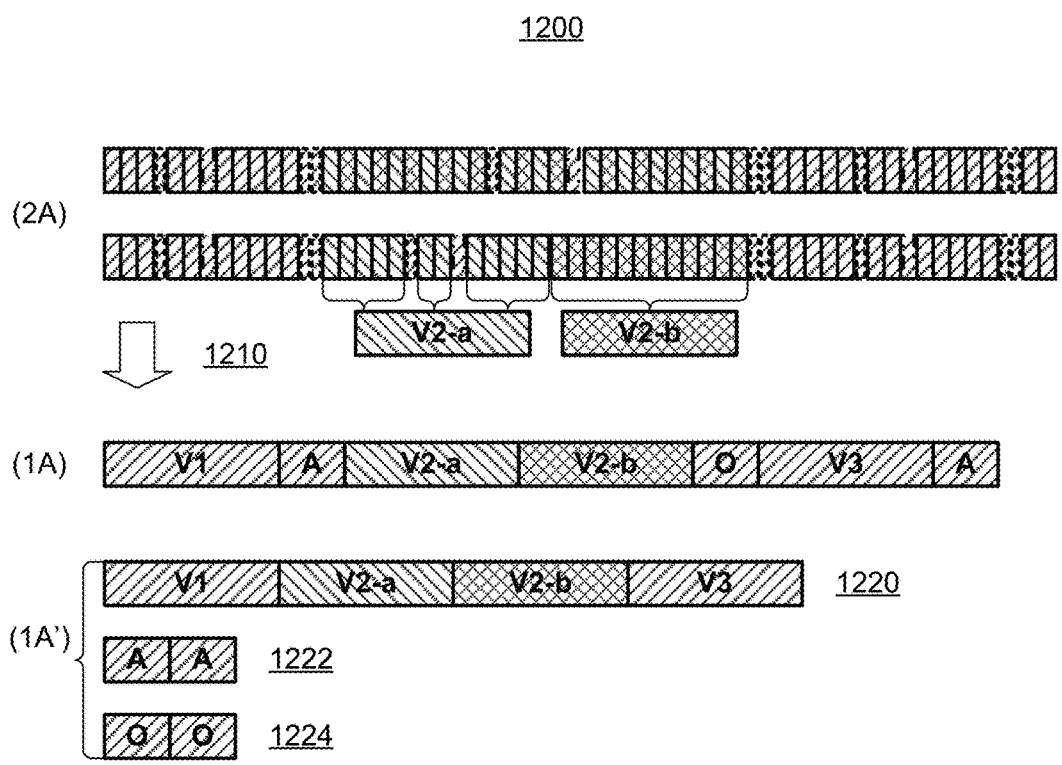
FIG. 12 is an illustration of a process for converting from "fixed-size packet" to "frame base" by re-using all of the same video data included in the original stream.

FIG. 12 is an illustration of a process 1200 for converting from "fixed-size packet" to "frame base" by re-using all of the same video data included in the original stream. The conversion case 1210 is a conversion from stream 2A to stream 1A in which the encrypted video data is preserved. Further, the video data is re-multiplexed from the "fixed-size packet" format (e.g. MPEG-TS) to the "frame base" format (e.g. MP4). The audio data and other data will be also re-multiplexed into the "frame base" format in the same manner. The conversion output file (format 1A') in the "frame base" format can be separate track files with video 1220, audio 1222, and other data 1224.

Figure 13:
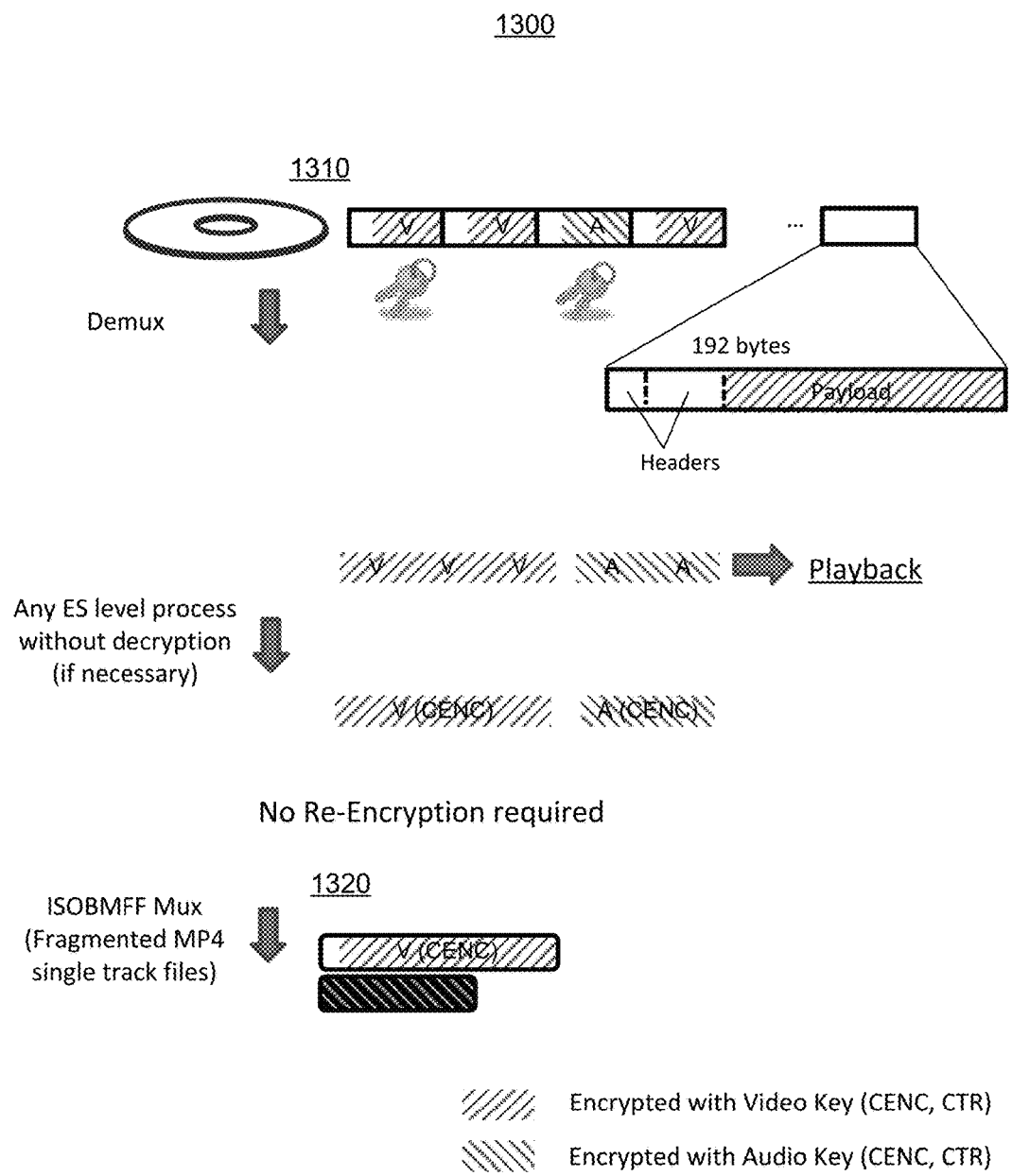
FIG. 13 is an illustration in which the original file uses the "fixed-size packet" format (e.g., MPEG-TS plus a four-byte header equal to 192 byte packets) with video and audio ES layer encryption.
Figure 14:
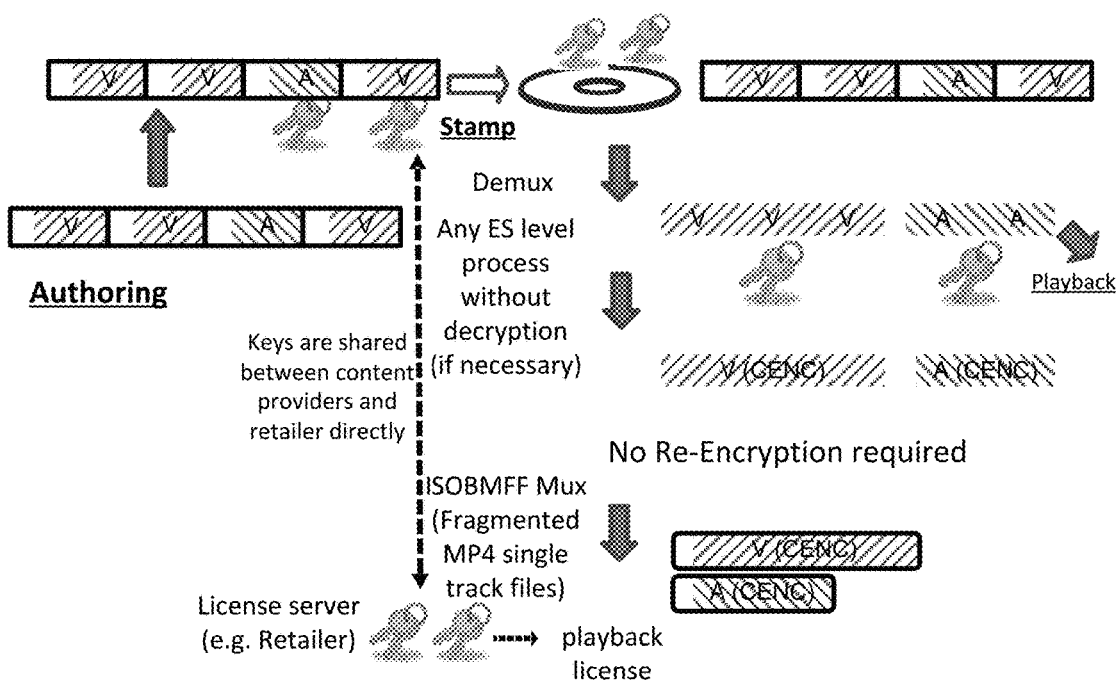
FIG. 14 is an illustration showing how the content playback keys are to be managed.

FIGS. 13 and 14 illustrate the details of the file format conversion without re-encryption. FIG. 13 is an illustration 1300 in which the original file 1310 uses the "fixed-size packet" format (e.g., MPEG-TS plus a four-byte header equal to 192 byte packets) with video and audio ES layer encryption. The conversion output file 1320 uses the "frame base" format (e.g. ISO Base Media File Format (ISOB-MFF), single track files) with video and audio ES layer encryption (e.g. Common Encryption). FIG. 14 is an illustration 1400 showing how the content playback keys are to be managed.

Figure 15:
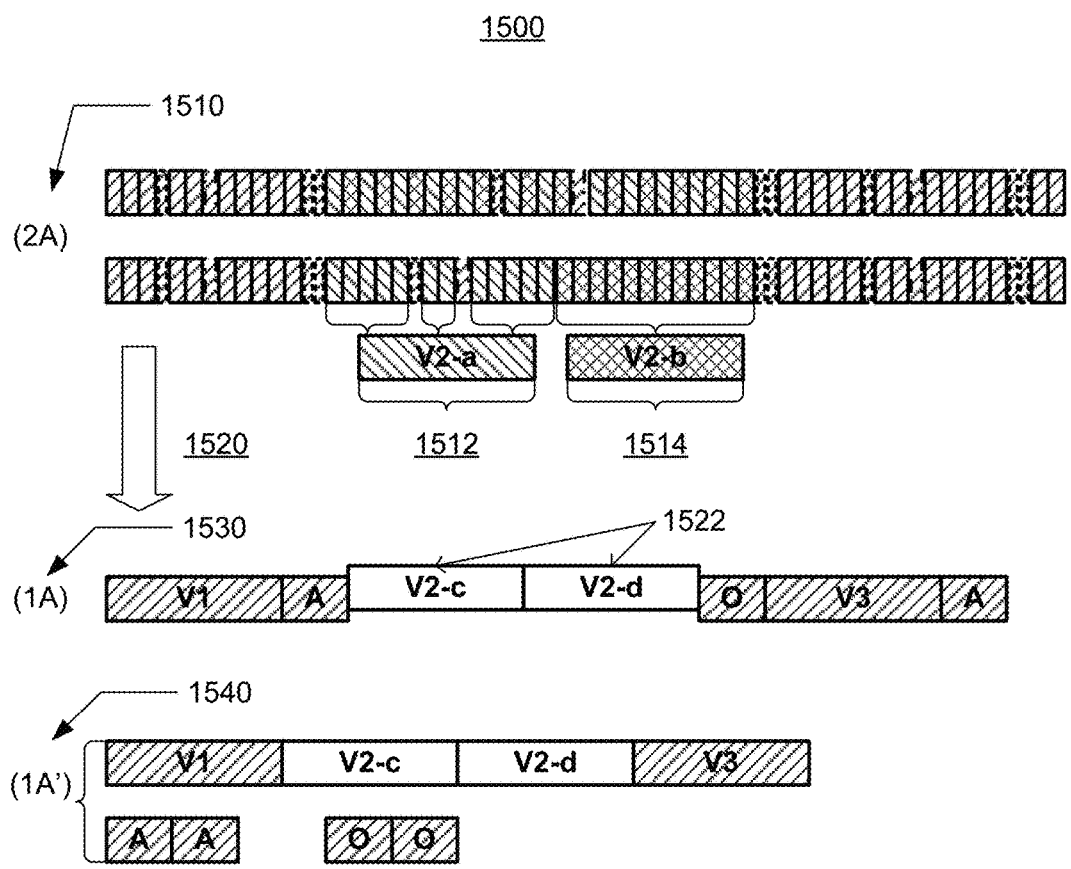
FIG. 15 is an illustration of a process for converting from the "fixed-size packet" format to the "frame base" format by providing alternative data for the use after the conversion.

FIG. 15 is an illustration of a process 1500 for converting from the "fixed-size packet" format 1510 to the "frame base" format 1530 by providing alternative data for the use after the conversion. The conversion case 1520 is a conversion from stream 2A 1510 to stream 1A 1530 in which the original variation of the video data is reused. For playback, either one of the video variations (V2-*a* or V2-*b*) is decryptable by a particular player unit which has only one key assigned to one of the variations. The content author prepares V2-*c* and V2-*d* portion of the data format stream (1A) separately from the original format stream (2A) and provide V2-*c* and V2-*d* portions of the data as a separate file on the media or from a server. Thus, blocks 1522 make up separately prepared encrypted blocks (including video variations).

The conversion process 1520 discards V2-*a* 1512 and V2-*b* 1514 portions from the original video data and inserts V2-*c* and V2-*d* data as replacements. V2-*c*/V2-*d* may or may not be the same video data as V2-*a*/V2-*b*, and may or may not be encrypted with same keys as V2-*a*/V2-*b*. The playback license for data format (1A) may provide a different set of keys compared to the keys used for data format (2A). By providing already encrypted separate variation data for data format (1A), the content author may be able to use different techniques to prepare variations dedicated for data formats (2A) and (1A). The playback of data format (2A) and (1A) also can be managed by a different set of keys, and potentially use different watermark identifiers in a decrypted image. Thus, the conversion output file can be separate track files with each of the video, audio, and others data units as shown in format (1A') 1540.

Figure 16:
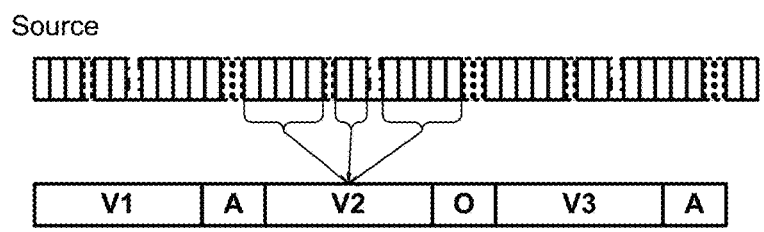
FIG. 16 is an illustration of a media format with multiplexed video, audio, and other data units in a fixed-size packet in accordance with one implementation.
Figure 16:
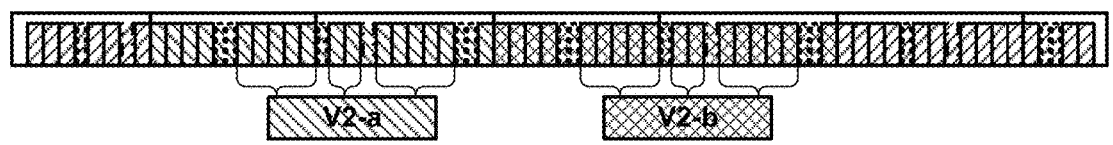
Figure 16:
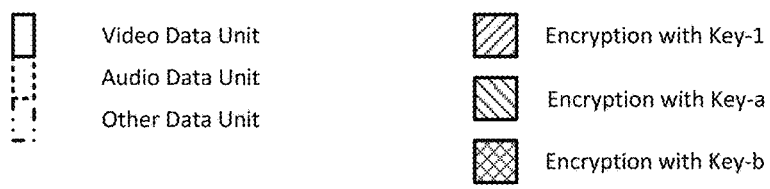

FIG. 16 is an illustration 1600 of a media format with multiplexed video, audio, and other data units in a fixed-size packet in accordance with one implementation. The multiplexing is applied in a fixed-sized packet (e.g., an MPEG-TS based broadcasting in Blu-ray Disc Format). In this implementation, the individualization can be applied by frame basis (or larger units), but consideration for the fixed-size packet sequence is needed. In a case in which encryption is also applied on a frame basis (e.g., stream 2A), encryption does not affect selection of the individualization segment. In a case in which an encryption unit overlaps with different types of elementary streams (e.g., stream 2B 1610), the selection of individualization segment can be done at the unit of one or more encryption block.

Although the illustration 1600 is based on a frame-based video watermarking, other means such as longer length video marking or audio watermarking can be applied through the same segmentation approach. The multiplexing layer (such as MPEG-TS header and other container format layer) is omitted to simplify the illustration 1600. Further, frames V2-a and V2-b may have different video watermark inserted. The payload for storing information can be provided by having multiple segments individualized across the entire content sequence. Thus, the individualization can be applied to the encryption block(s) where the target video frame (V2 in FIG. 16) is included. Individualized segments may include other video frame data or audio data. These blocks can exist in one file, or can be stored as separate files and played continuously.

Figure 17:
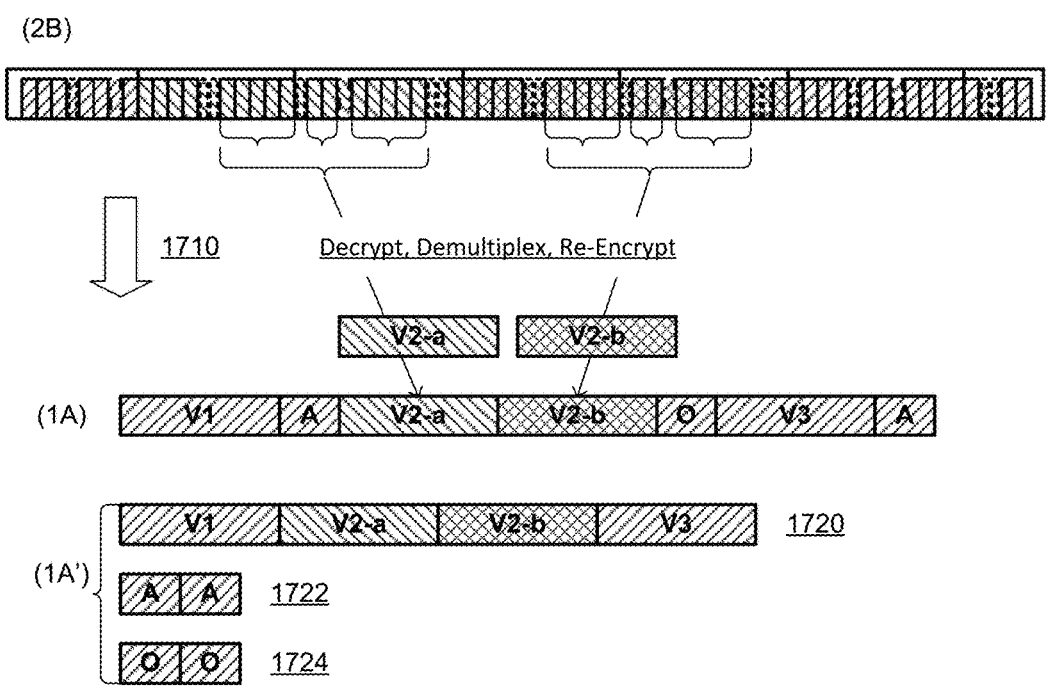
FIG. 17 is an illustration of a process for converting from "fixed-size packet" to "frame base" by re-using all of the same video data included in the original stream.

FIG. 17 is an illustration of a process 1700 for converting from "fixed-size packet" to "frame base" by re-using all of the same video data included in the original stream. The conversion case 1710 is a conversion from stream 2B to stream 1A in which the original variation of the video data is reused. The original encryption block data in format (2B) is decrypted and the video data is de-multiplexed. Further, the encryption is applied to the video ES layer, thus, re-multiplexing to the "frame base" format (also see FIG. 18). The conversion output file (format 1A') in the "frame base" format can be separate track files with video 1720, audio 1722, and other data 1724.

Figure 18:
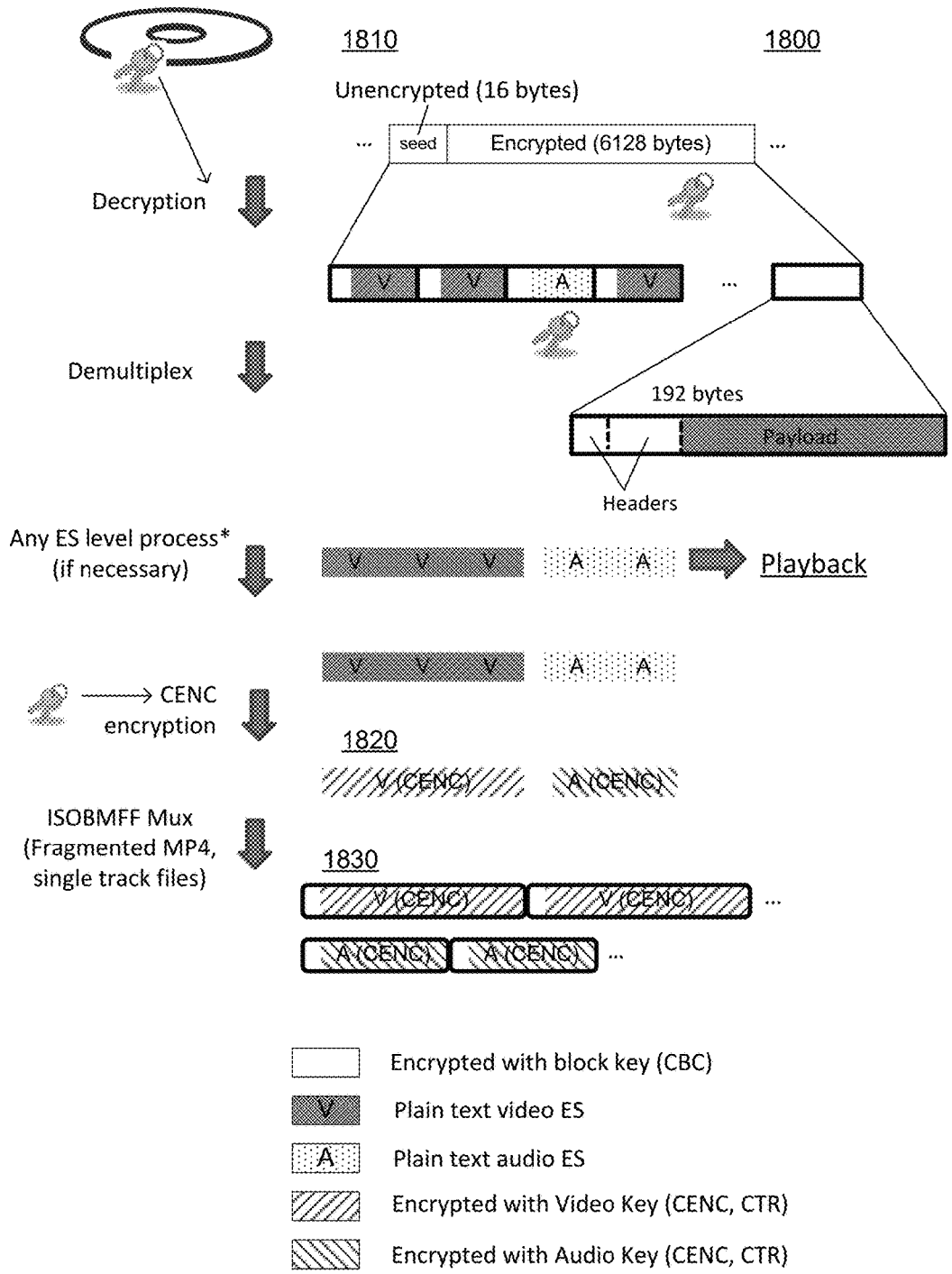
FIG. 18 is an illustration in which the original file uses the "fixed-size packet" format (e.g., MPEG-TS plus a four-byte header equal to 192 byte packets) with fixed size block (e.g. 6144 byte, 16 bytes seed+6128 bytes encrypted data) encryption.
Figure 19:
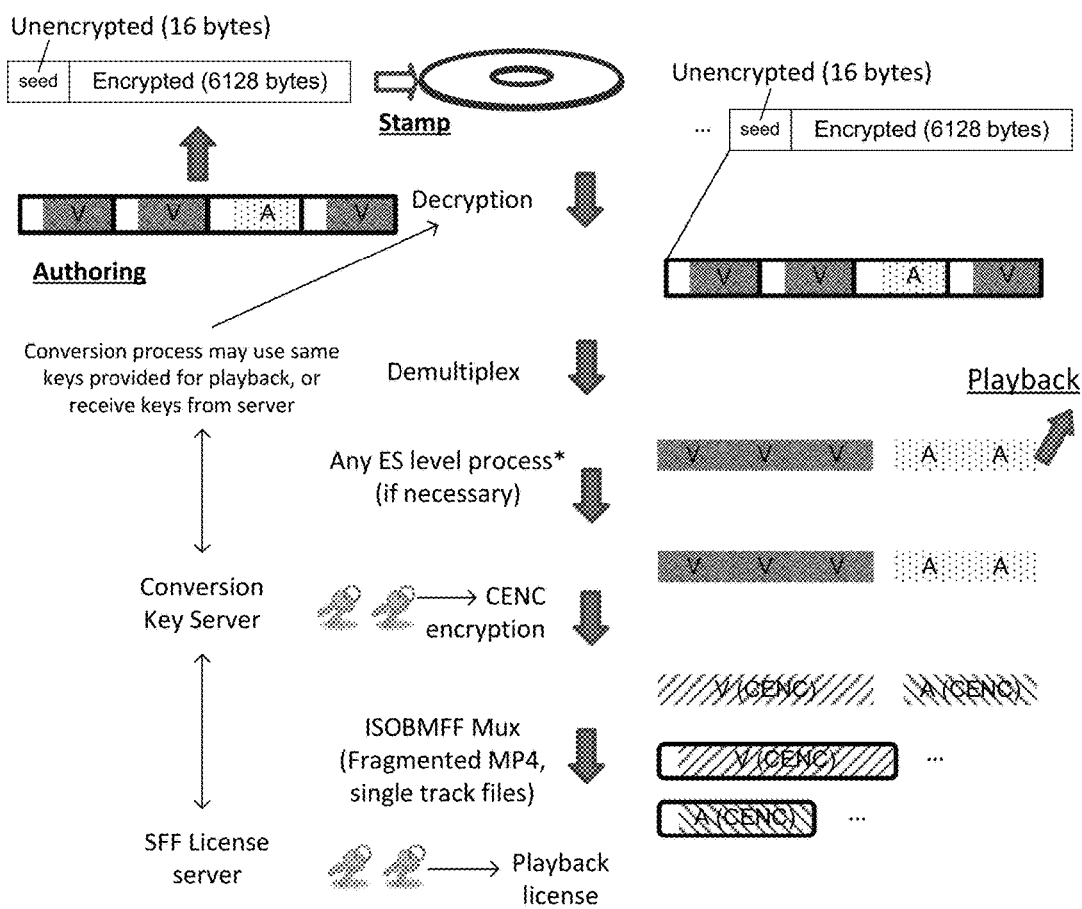
FIG. 19 is an illustration showing how the content playback keys are to be managed.

FIGS. 18 and 19 illustrate the details of the file format conversion with re-encryption. FIG. 18 is an illustration 1800 in which the original file 1810 uses the "fixed-size packet" format (e.g., MPEG-TS plus a four-byte header equal to 192 byte packets) with video and audio ES layer encryption. The conversion output file 1830 uses the "frame base" format (e.g. ISO Base Media File Format (ISOBMFF), single track files) with video and audio ES layer encryption (e.g. Common Encryption). The difference between the illustration 1300 of FIG. 13 and the illustration 1800 of FIG. 18 is that the file format conversion occurs with a re-encryption, as shown in 1820. FIG. 19 is an illustration 1900 showing how the content playback keys are to be managed. In FIG. 19, the conversion process may use the same keys provided for playback or receive keys from the server. The conversion keys are generated using the original key or are generated independently.

Figure 20:
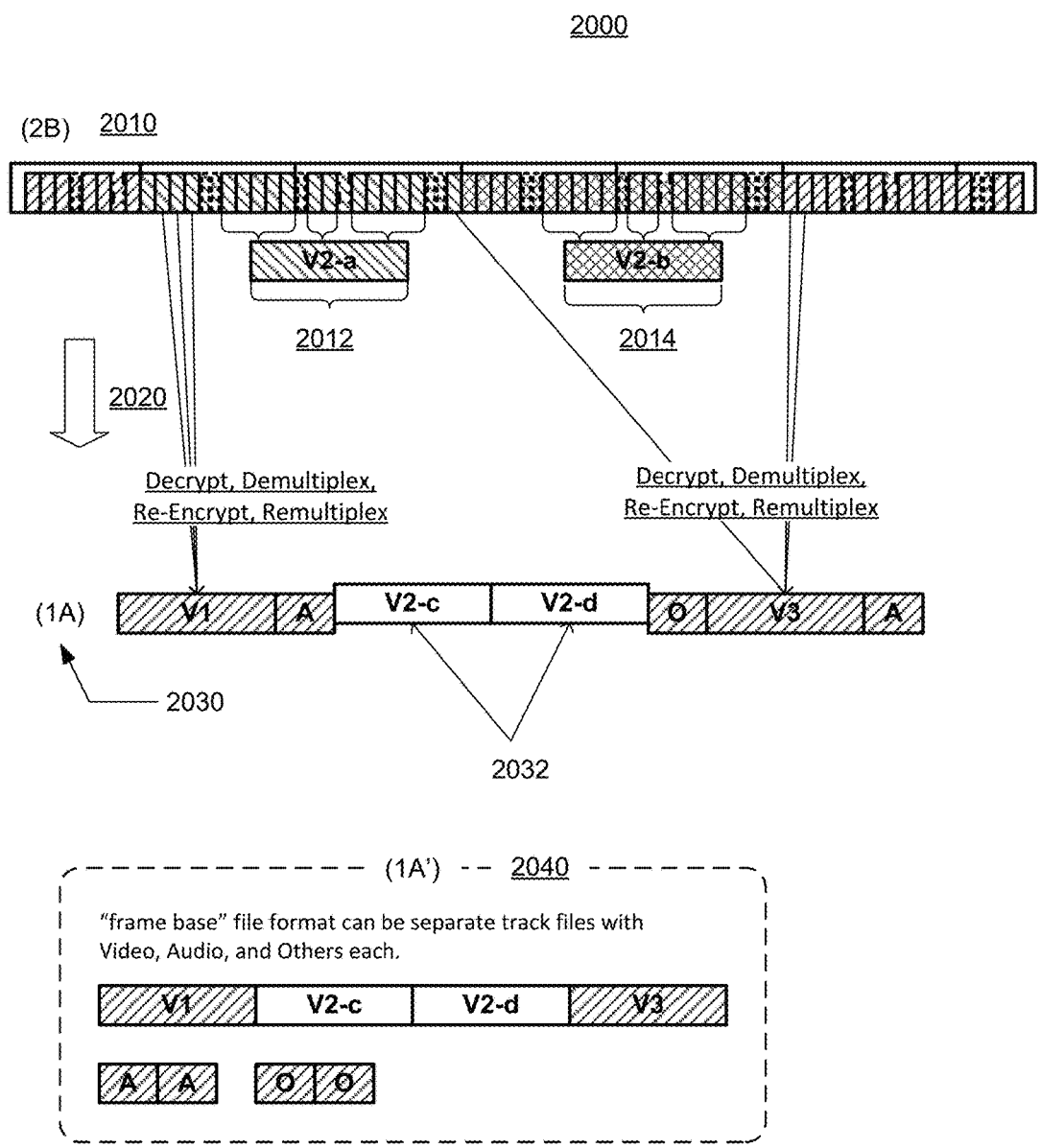
FIG. 20 is an illustration of a process for converting from the "fixed-size packet" format to the "frame base" format by providing alternative data for the use after the conversion.

FIG. 20 is an illustration of a process 2000 for converting from the "fixed-size packet" format 2010 to the "frame base" format 2030 by providing alternative data for the use after the conversion. The conversion case 2020 is a conversion from stream 2B 2010 to stream 1A 2030 in which the video data is reused. For playback, either one of the video variations (V2-a or V2-b) is decryptable by a particular player unit which has only one key assigned to one of the variations. The content author prepares V2-c and V2-d portion of the data format stream (1A) separately from the original format stream (2B) and provide V2-c and V2-d portions of the data as a separate file on the media or from a server. Thus, blocks 2032 make up separately prepared encrypted blocks (including video variations).

The conversion process 2020 discards V2-a 2012 and V2-b 2014 portions from the original video data and inserts V2-c and V2-d data 2032 as replacements. V2-c/V2-d may or may not be the same video data as V2-a/V2-b, and may or may not be encrypted with same keys as V2-a/V2-b. The playback license for data format (1A) may provide a different set of keys compared to the keys used for data format (2B). By providing already encrypted separate variation data for data format (1A), the content author may be able to use different techniques to prepare variations dedicated for data formats (2B) and (1A). The playback of data format (2B) and (1A) also can be managed by a different set of keys, and potentially use different watermark identifiers in a decrypted image.

For the portions where there is no variation of video in the original data (2B), the conversion process 2020 needs to decrypt the original encryption block data in format (2B) and demultiplex the video data. Further, the encryption is applied to the video ES layer, thus, re-multiplexing to the "frame base" format. For the portions where there is no variation of video in the original data (2B), there is a benefit to using the original data as it typically occupies most of the size of original (2B) data. Thus, reusing the video data in this manner can minimize the size of separately prepared data 2032. Thus, the conversion output file can be separate track files with each of the video, audio, and others data units as shown in format (1A') 2040.

Figure 21:
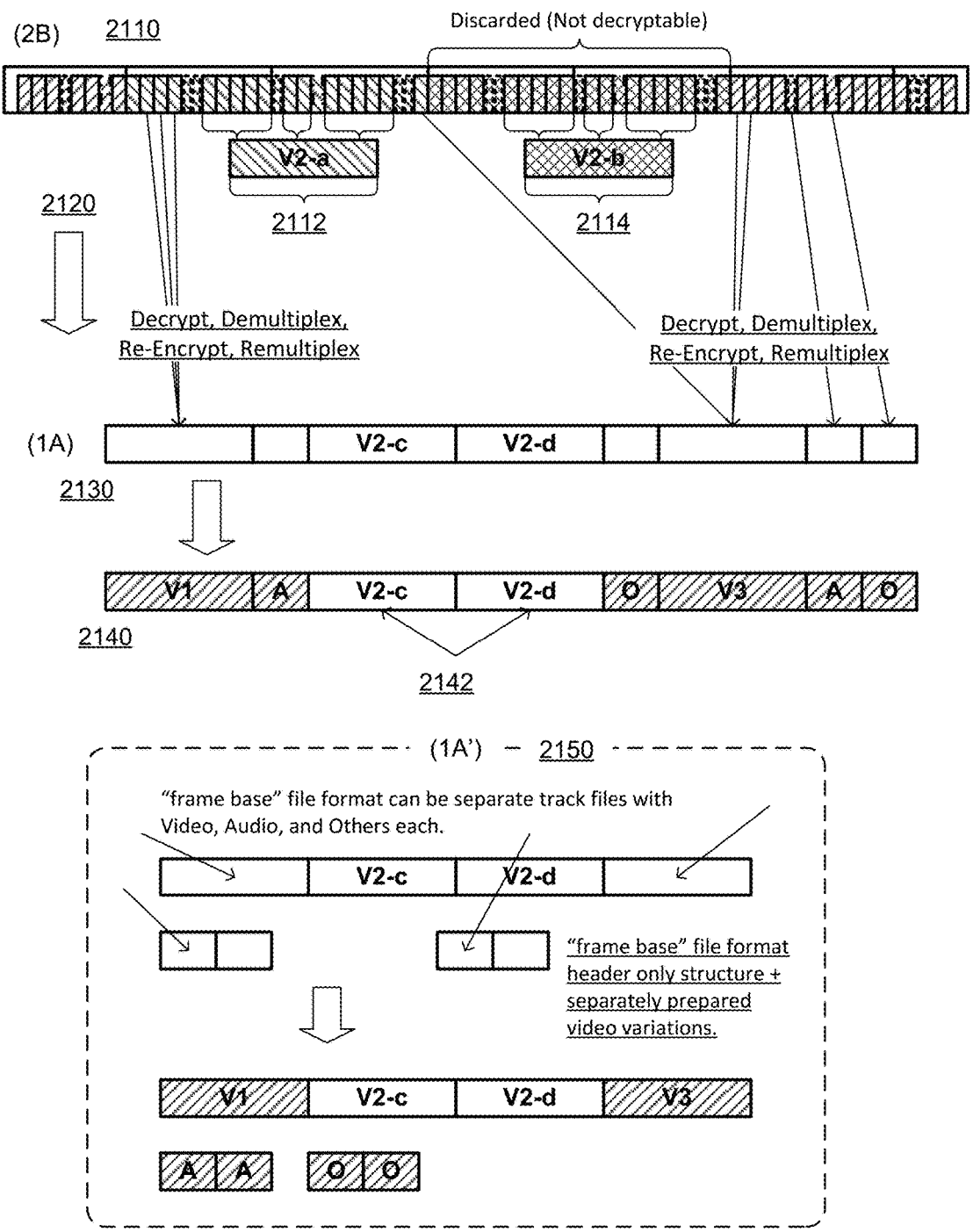
FIG. 21 is an illustration of a process to include separately prepared video variations in the conversion output files.

FIG. 21 is an illustration of a process 2100 to include separately prepared video variations in the conversion output file format header files. The content author prepares the "frame base" file format header only structure including separately prepared encrypted video variations (V2-c/V2-d). The conversion process 2120 decrypts, de-multiplexes, re-encrypts, and re-multiplexes data from the original (2B) file format 2110. The conversion process 2120 has access to a key which can decrypt only the blocks which includes V2-a or V2-b (but not both). The conversion process 2120 re-encrypts and re-multiplexes the data other than V2-a portion 2112, and uses V2-c and V2-d already separately prepared data 2142 instead of V2-a/V2-b 2112, 2114. The existence of separately prepared V2-c/V2-d data itself may be used to identify where the original video data needs to be discarded. V2-c/V2-d may be two separate video frames encrypted separately or are one video frame and metadata structure depending on the format of (1A) 2130 and (1A') 2150.

Figure 22:
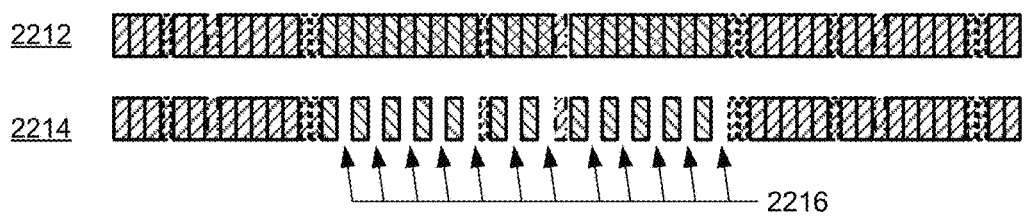
FIG. 22 is an illustration of consideration for playback system performance (e.g. optical disc)
Figure 22:
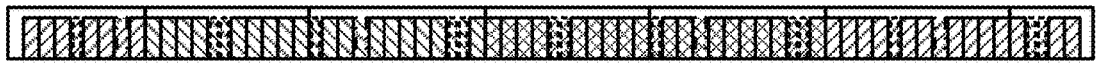
Figure 22:
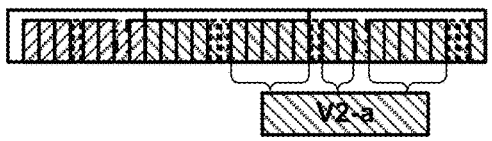
Figure 22:

FIG. 22 is an illustration 2200 of consideration for playback system performance (e.g. optical disc). Some playback system such as optical disc has limitation in the performance of seek time and jump between sectors in the media. For a case in which a playback with individualized segment selection requires drive seek and jump among different media files, a player needs to buffer enough data before the jump, which requires a minimum data size for each of the individualized segments (depending on the content data rate, drive transfer rate, seek time, etc.). As the minimum data size of each individualized segment gets larger, the total data size overhead for the individualization becomes large, which causes a higher cost or data capacity for the delivery systems. If media file format and encryption scheme (e.g. frame base, or fixed encryption block size) allows smaller size of the individualized segment, it becomes much more efficient to read all data (including individualized segments not playable due to key mismatch) and then discard segments which are not playable.

In the illustrated implementation of FIG. 22, all segments are stored as one file for both format 2A 2210 and format 2B 2220. For format 2A 2210, the player reads all data 2212 and processes only playable/decryptable portions 2214. For example, packets 2216 that are encrypted with Key-b (which are not decryptable with Key-b) are not sent to decryption. For format 2B 2220, the player reads all data 2222 and processes only playable/decryptable portions 2224, leaving out packets 2226. In both formats 2A and 2B, the discarded data size is the minimum individualization block size (approximately one video frame).

Figure 23:
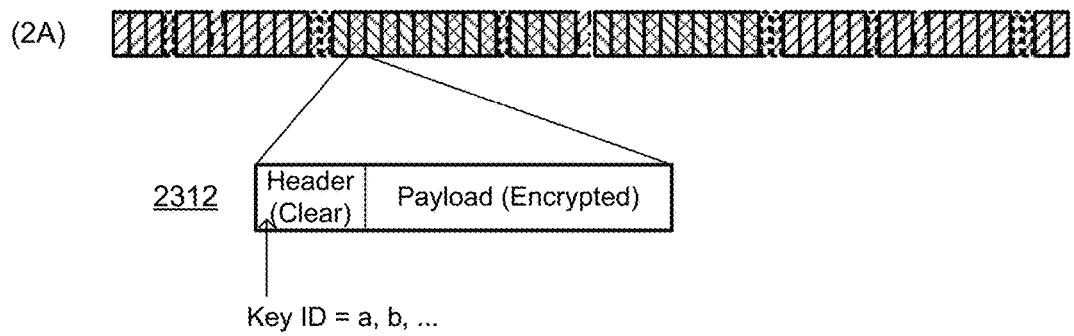
FIG. 23 is an illustration of identifying a key match in accordance with one implementation.
Figure 23:
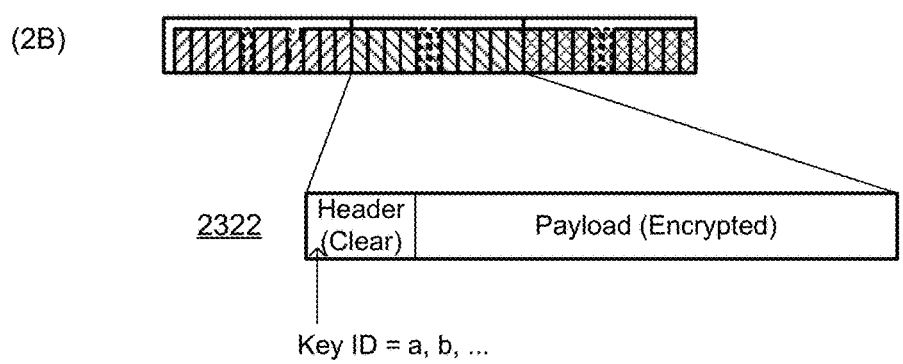

FIG. 23 is an illustration 2300 of identifying a key match in accordance with one implementation. For a case in which a media file format has a header for each packet (either frame-by-frame basis or each fixed-size packet), the header can include identification of key matching (e.g., KeyID). In other implementations, a mapping table (not shown), which lists key IDs and target packets (blocks) for each Key ID, is used. The mapping table can use parameter(s) such as a byte offset, packet number, or encryption block number (or other fixed block numbers depending on the minimum unit of key ID change).

FIG. 23 show examples of MPEG-TS cases for format 2A 2310 and format 2B 2320. A packet 2312 (e.g., a transport packet) is shown for format 2A 2310. An encryption block 2322 (e.g., 6144 bytes in the case for AACS encryption applied to Blu-ray Disc format) is shown for format 2B 2320. For this format 2320, the first N bits of the packet (or the encryption block) can be used to identify up to $N^2$ different keys. Accordingly, the player reads all data, and checks Key ID (for every packet or encryption block), and decrypts only the packets/blocks with the Key IDs that match the keys to which the player has access.

Figure 24:
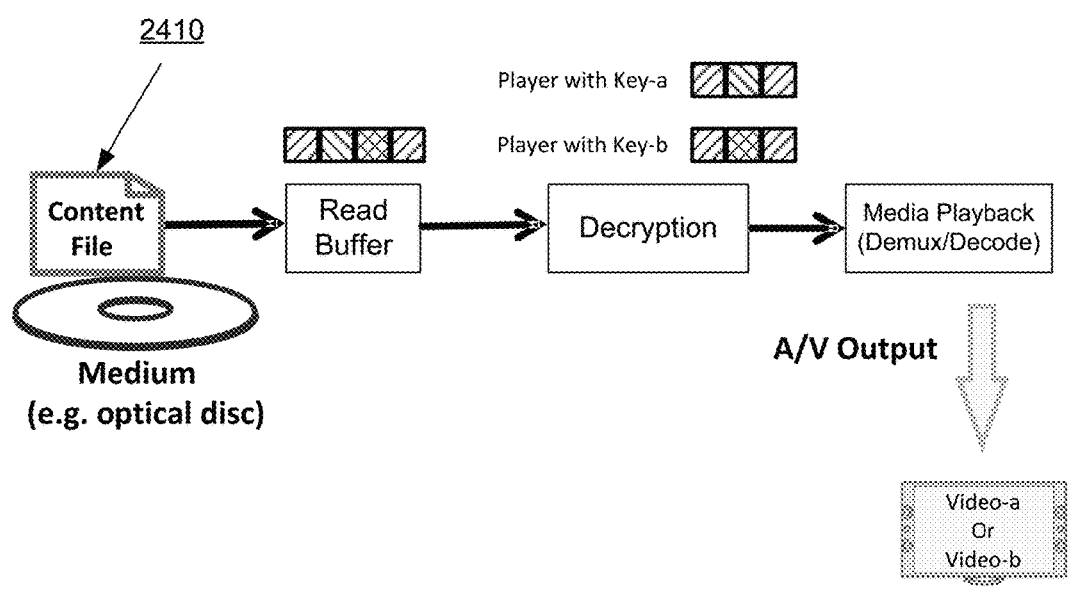
FIG. 24 is a playback system flow diagram in accordance with one implementation.

FIG. 24 is a playback system flow diagram 2400 in accordance with one implementation. In this implementation, the content file 2410 includes all individualized segments, and is contiguously readable.

Figure 25:
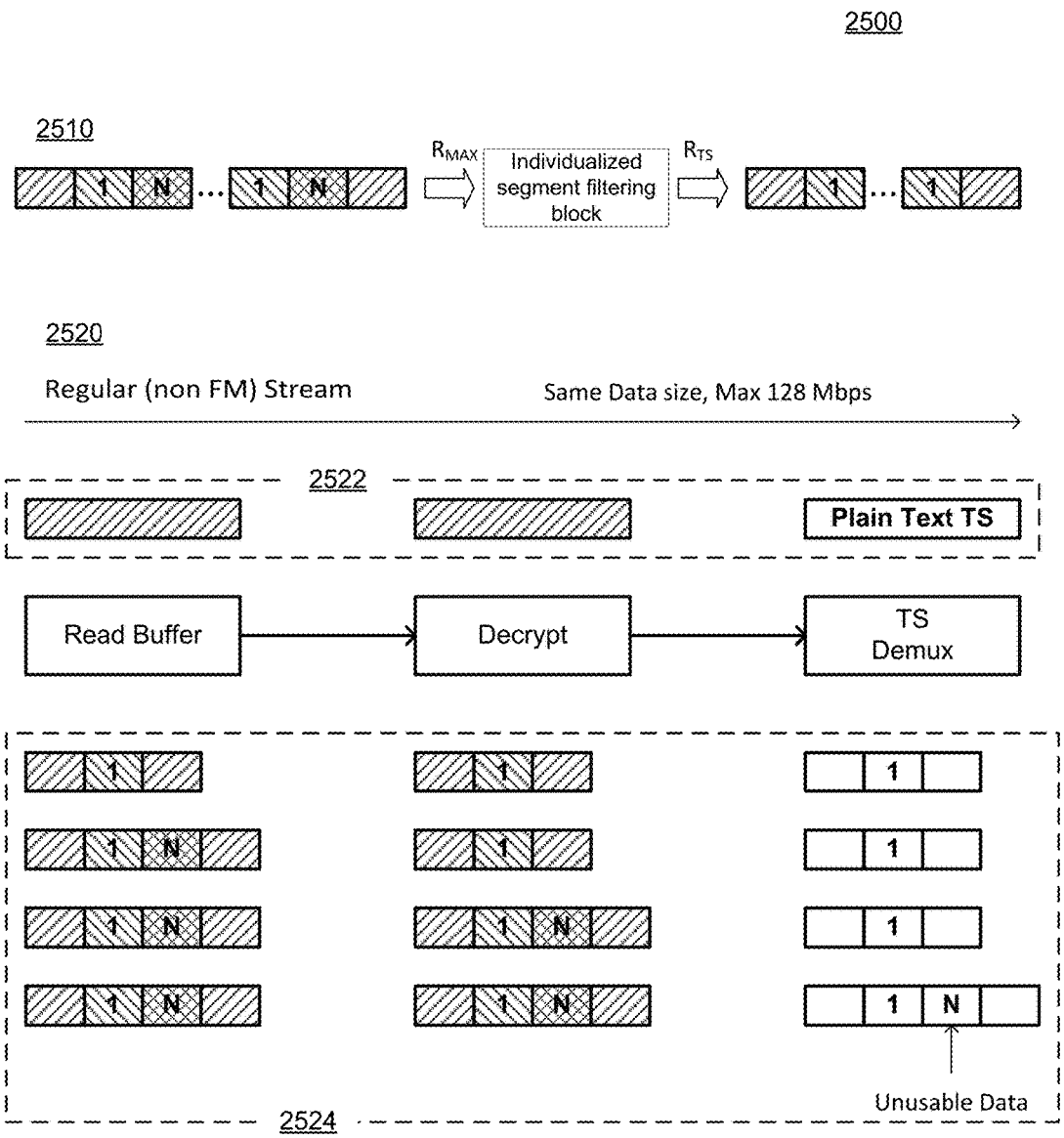
FIG. 25 is an illustration of flow diagrams for individualized segment filtering in accordance with four different implementation examples.

FIG. 25 is an illustration 2500 of flow diagrams for individualized segment filtering in accordance with one implementation. Flow diagram 2510 is a high level diagram, while flow diagram 2520 is an actual implementation. In flow diagram 2510, $R_{MAX}$ is a maximum data rate from the source (e.g. Optical drive, HDD, flash memory, etc.), $R_{TS}$ is a content data rate (e.g. MPEG-TS rate, MP4 file rate, etc.), and N is the number of variations (N=2 in this case).

Flow diagram 2520 illustrates how the processing of content with individualized segments depends on the player implementation. Stream 2522 is a non-individualized stream, while streams 2524 are individualized streams. Some implementations may filter unnecessary blocks first, while implementations may send all variations of the data to content wrapping (MPEG-TS, MP4, etc.) demultiplex engine and utilize such demultiplex engine to handle filtering.

Potential difficulties for implementations of FIG. 25 include the fact that data supply and buffer control is predictable. For example, when the playback engine needs one second of data, sending one second of the original content maximum bitrate is enough. Further, it is difficult to handle locally very high bitrate (e.g. maximum regular content bitrate*N), while keeping buffer and/or data supply control stable. For example, even if buffer control sent data with "one second*regular content data rate", it may not be always enough for one second of playback.

Figure 26:
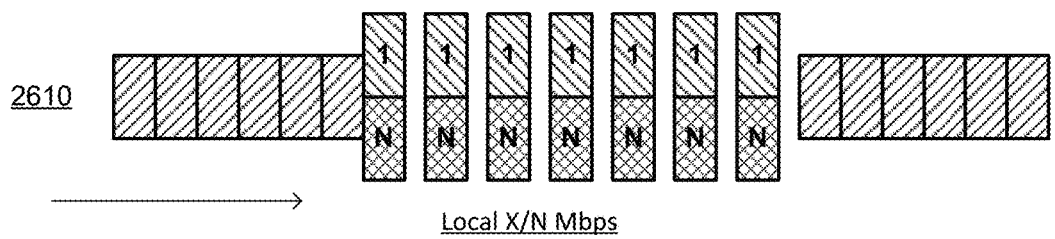
FIG. 26 is an illustration showing the bitrate impact of the individual segments for various content preparation methods in accordance with three different implementation options.
Figure 26:
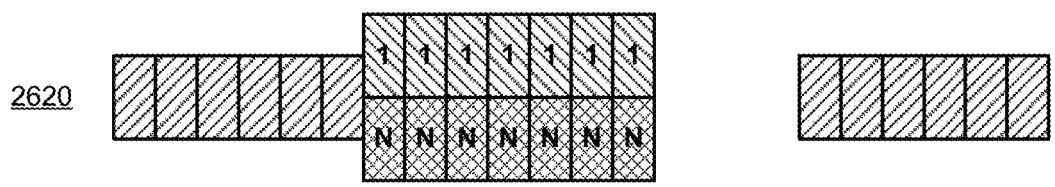
Figure 26:
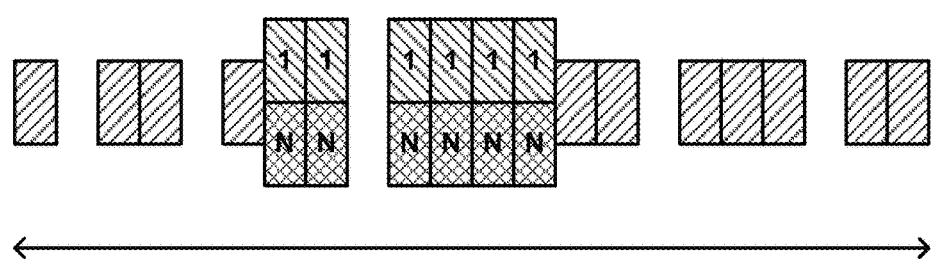

FIG. 26 is an illustration 2600 showing the bitrate impact of the individual segments for various content preparation methods in accordance with one implementation. In FIG. 26, same clip includes common segments and individualized segments, and each segment will stay the bitrate within the maximum bitrate of the content (e.g. X Mbps).

In case 1 (2610), a lower bitrate (<X/N Mbps) of the MP4/MPEG-TS multiplexing speed is intentionally used to keep the container format (MP4/MPEG-TS) layer total data rate within the original content maximum bitrate (X Mbps). This case 2610 requires a special multiplex mode during individualized segment, and requires video/audio data to be locally limited for the individualized segment. In case 2 (2620), the individualized segment still uses maximum original content bitrate (X Mbps), but limits the individualized segment data size small enough to make the total bitrate lower for the duration of the individualized segment. This case 2620 allows continuous regular X Mbps rate multiplex without impacting the local bitrate of the video/audio data. However, the data size is still limited, and affects video/audio encoding. In case 3 (2630), a specific time duration (e.g. one second or two seconds) is defined and the local average total data rate is kept under the original content maximum bitrate (X Mbps). In case 4 (2640), parameters are kept the same as case 3, but the local average total data rate is allowed to be higher than the original content maximum bitrate (X Mbps). In case 4, the system which does not have very fast source media data reading rate (e.g. Optical Disc) will need additional rules to handle this higher data rate segment. For cases 3 and 4, the concept of the local average total data rate (e.g. average rate of total data for two seconds plus/minus one second of the start time of the individualized segment). This enables utilization of unused TS packet slots which usually exist in commercial video titles and reduce impact on the video/audio quality. If the local average rate remains within X Mbps, the buffering model for the higher data rate segment is not necessary. Otherwise, if the local average rate needs to exceed X Mbps, an additional buffering model to handle such high bitrate is still required.

Figure 27:
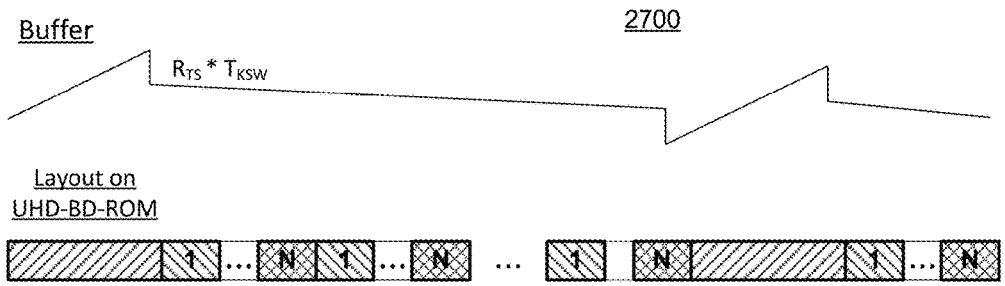
FIG. 27 is an illustration showing the impact of a segment filtering process on the playback model in accordance with one implementation.

FIG. 27 is an illustration 2700 showing the impact of a segment filtering process on the playback model in accordance with one implementation. In the illustrated implementation of FIG. 27, the assumptions are that: (1) to play the content with the individualized segments, the player needs to switch the decryption keys for key-1, key-a, key-b, and so on; (2) there may be different player implementations on how to switch the keys (e.g., (a) cache all keys in secure CPU, and switch keys immediately, (b) set next key for every key switching, and interrupt from main CPU to secure CPU for every key change); and (3) in case the data rate of the individualized segment block is higher than the original content maximum bitrate (X Mbps), the player needs to buffer the content data before processing the high bitrate blocks.

The impact of the decryption Key switching time ($T_{KSW}$) on the segment filtering model is varied according to the cases defined in FIG. 26. For case 1, there is no need to consider decryption key switching time overhead ($T_{KSW}$=0). For case 2, since the decryption Key switching occurs in parallel to the data read/transfer process, the decryption key switching time may or may not affect data supply depending on the length of segments. For case 3, the decryption key switching needs to pause the data read/transfer process ($T_{KSW}$=fixed time duration).

Figure 28:
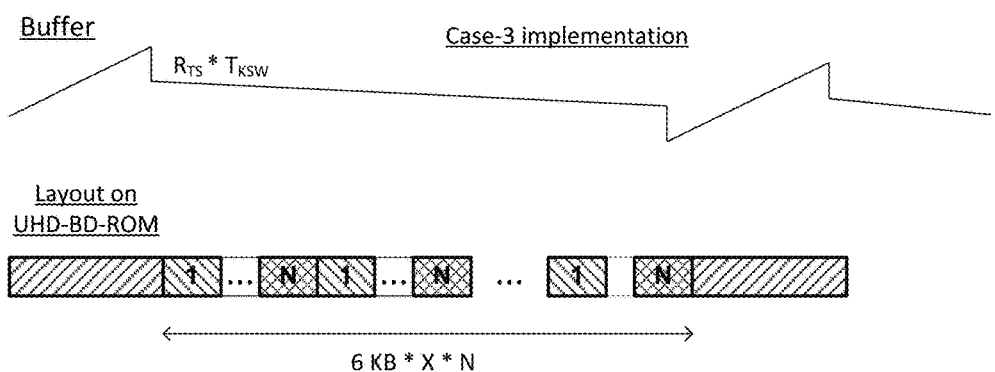
FIG. 28 is an illustration showing an example of the impact of the segment filtering process on the playback model with 6 KB encryption block (e.g. Blu-ray Disc)

FIG. 28 is an illustration 2800 showing an example of the impact of the segment filtering process on the playback model with 6 KB encryption block (e.g. Blu-ray Disc). The illustrated implementation of FIG. 28 applies when the source media can provide continuous data supply. Otherwise, if the continuous data supply is not guaranteed, (e.g.

Optical Disc sector jump, layer jump, etc.), then such an overhead needs to be considered separately. In FIG. 28, the impact of the segment filtering is translated to the time of interruption on data reading process for segment filtering ($T_{SF}$). For case 1, there is no need to consider decryption key switching time overhead ($T_{SF}$=6 KB*X*(N−1)/$R_{MAX}$). For case 2, the decryption Key switching occurs in parallel to the data read/transfer process, and $T_{SF}$=MAX [(6 KB*X*(N−1)/$R_{MAX}$), 2*$T_{KSW}$]. For case 3, the decryption key switching needs to pause the data read/transfer process ($T_{SF}$=(6 KB*X*(N−1)/$R_{MAX}$)+2*$T_{KSW}$).

Table 1 below summarizes the results of various cases in accordance with one implementation. For the cases, following assumptions are made: (1) the source media data rate is equal to 144 Mbps and the original content maximum data rate is equal to 128 Mbps; (2) one video frame in 24 fps video (1/24 sec) and 128 Mbps TS rate (=average 0.67 MB of media data) is individualized; and (3) two and four variation cases are considered (with $T_{KSW}$=50 ms and 100 ms). Table 1 shows the impact of segment filtering translated to $T_{SF}$ (time of interruption on data reading process for segment filtering). Minimum size and time duration of the common segment which gives enough size of data in read buffer to continue playback of 128 Mbps*N size of individualized segment are calculated.

TABLE 1

| Case | $T_{KSW}$ | N | $T_{SF}$ (ms) | Min Common Seg (MB) | Min Common Seg (sec) |
|---|---|---|---|---|---|
| Case 1 | 50 ms | 2 | 38 | 6.42 | 0.42 |
| Case 1 | 50 ms | 4 | 115 | 19.44 | 1.27 |
| Case 1 | 100 ms | 2 | 38 | 6.42 | 0.42 |
| Case 1 | 100 ms | 4 | 115 | 19.44 | 1.27 |
| Case 2 | 50 ms | 2 | 100 | 16.90 | 1.11 |
| Case 2 | 50 ms | 4 | 115 | 19.44 | 1.27 |
| Case 2 | 100 ms | 2 | 200 | 33.80 | 2.22 |
| Case 2 | 100 ms | 4 | 200 | 33.80 | 2.22 |
| Case 3 | 50 ms | 2 | 138 | 23.32 | 1.53 |
| Case 3 | 50 ms | 4 | 215 | 36.34 | 2.38 |
| Case 3 | 100 ms | 2 | 238 | 40.23 | 2.64 |
| Case 3 | 100 ms | 4 | 315 | 53.24 | 3.49 |

Figure 29:
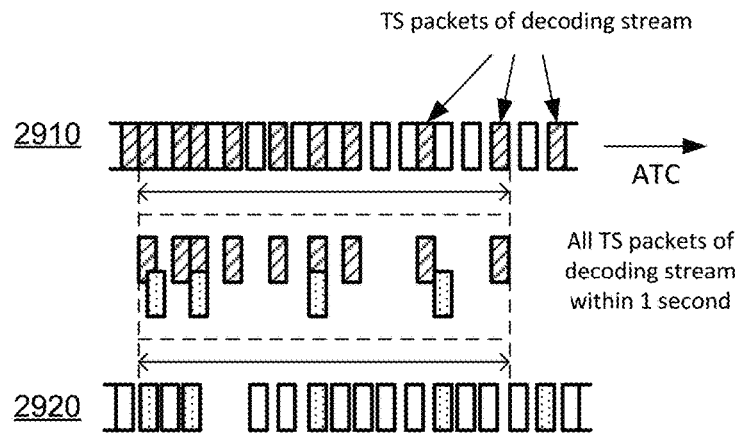
FIG. 29 includes a two-stream playback case, one from the disc and another from the binding unit data area (BUDA)
Figure 30:
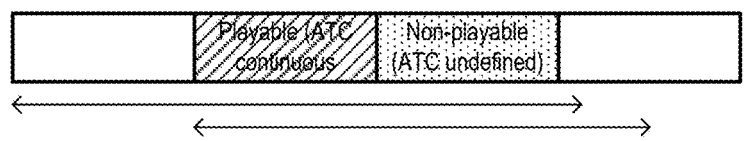
FIG. 30 has two types of data in the individualized segment: (1) Playable stream with ATC/STC sequence continuous to common segment; and (2) Non-playable data blocks.
Figure 30:
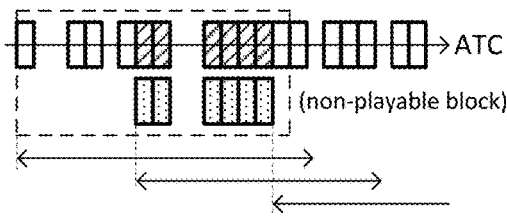

FIGS. 29 and 30 are illustrations 2900, 3000 showing various forensic WM bitrate models. The illustration 2900 of FIG. 29 includes a two-stream playback case, one 2910 from the disc and another 2920 from the binding unit data area (BUDA). The two-stream total decoding TS packets average bitrate for one second is restricted up to 48 Mbps (for 2D) and 64 Mbps (for 3D). Each stream file has its own arrival time clock/system time clock (ATC/STC) sequence, but the synchronous playback is realized using the presentation time stamp (PTS) layer reference in the video database file.

In the illustration 3000 of FIG. 30, to avoid requiring a system on chip (SoC) data processing speed beyond the ultra-high definition (UHD) Blu-ray (BD) Specification, the window (1-2 sec) average bitrate is limited. In FIG. 30, the individualized segment has two types of data: (1) Playable stream with ATC/STC sequence continuous to common segment; and (2) Non-playable data blocks that are inserted into the AV stream file (aligned units encrypted with the keys not accessible by the player). The window average total data rate is up to 128 Mbps (or other higher TS rate depending on the disc type). Since Forensic WM case has 6 KB boundary, the window at every 6 KB unit start point can be applied.

Figure 31:
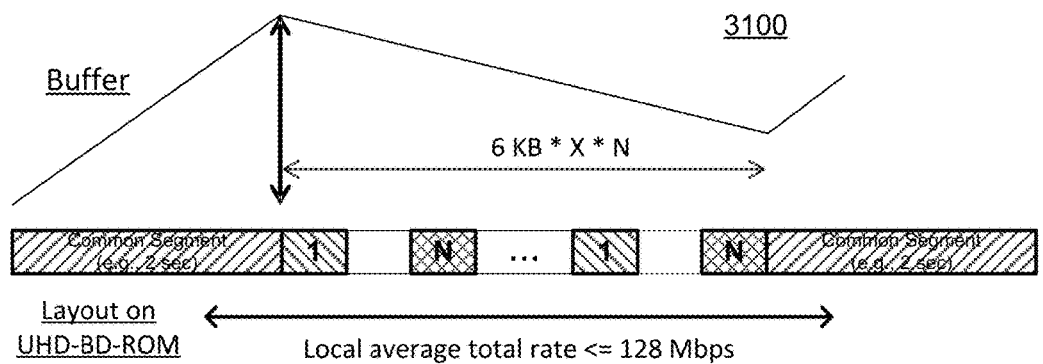
FIG. 31 shows the "no jump" case (i.e., continuous file reading) in which the common segment minimum length rule provides enough read buffer occupancy to process the individualized segment.
Figure 32:
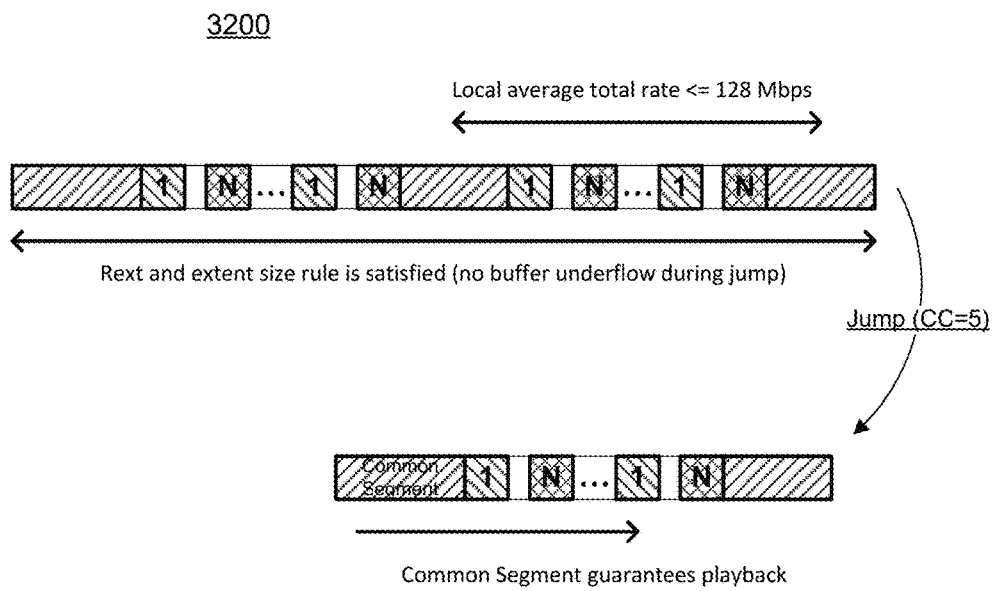
FIG. 32 shows the AV Stream file change case (seamless connection over CC=5) in which each clip starts from the common segment.
Figure 33:
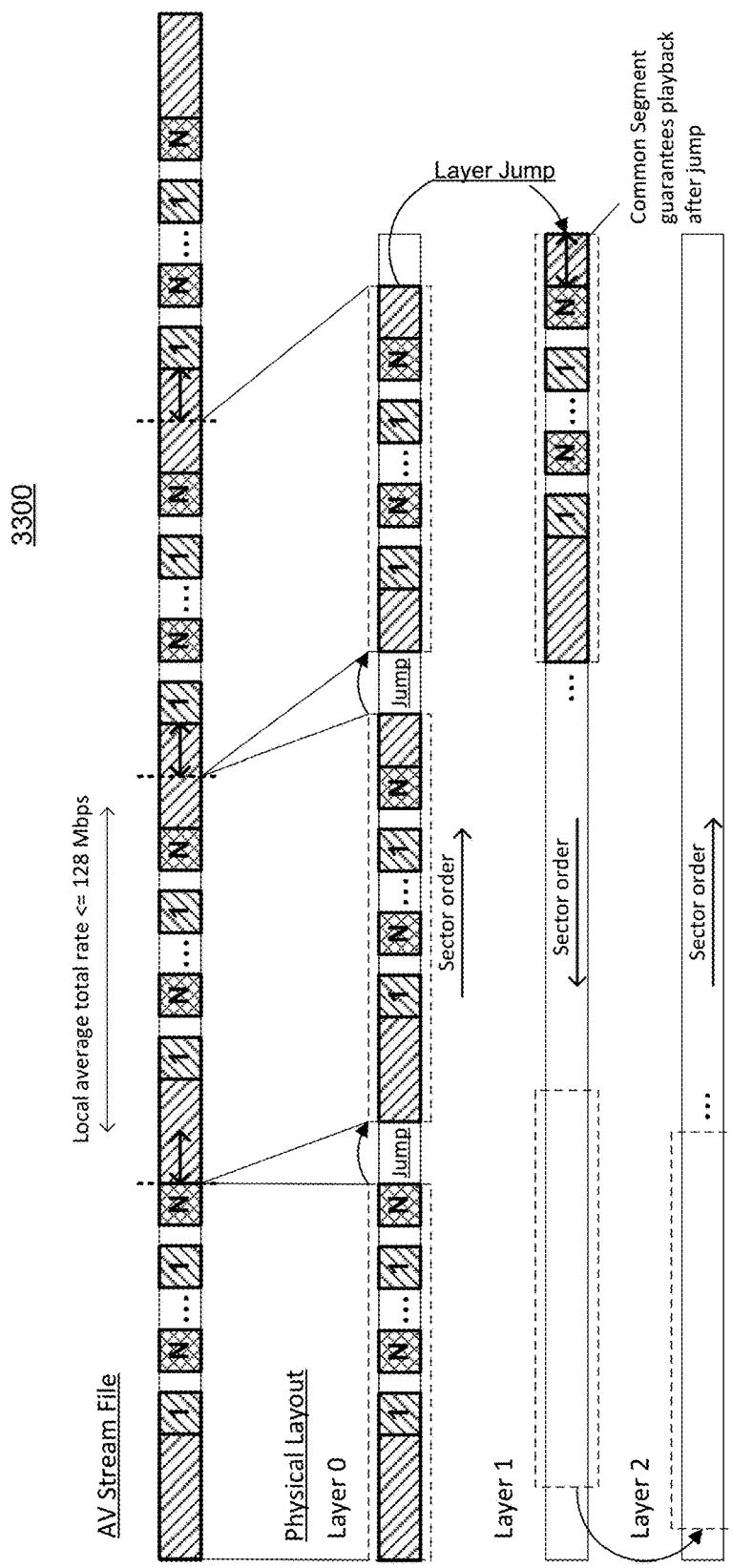
FIG. 33 shows another case in which a sector jump is included inside the same AV Stream file (intra-layer and inter-layer)

FIGS. 31, 32, and 33 are illustrations 3100, 3200, 3300 showing how the forensic WM bitrate models shown in FIGS. 29 and 30 (local average bitrate<=Max TS rate) work with various types of jump. The illustration 3100 of FIG. 31 shows the "no jump" case (i.e., continuous file reading) in which the common segment minimum length rule provides enough read buffer occupancy to process the individualized segment. If necessary, maximum size of the individualized segment is defined (and/or TS rate based adjustable rule). The illustration 3200 of FIG. 32 shows the AV Stream file change case (seamless connection over CC=5) in which each clip starts from the common segment. The illustration 3300 of FIG. 33 shows another case in which a sector jump is included inside the same AV Stream file (intra-layer and inter-layer). In this case, a minimum length of common segment at the start point of every extent can be required. That is, when inserting sector jump or layer break during authoring, an authoring tool needs to select a sector jump point.

Figure 34:
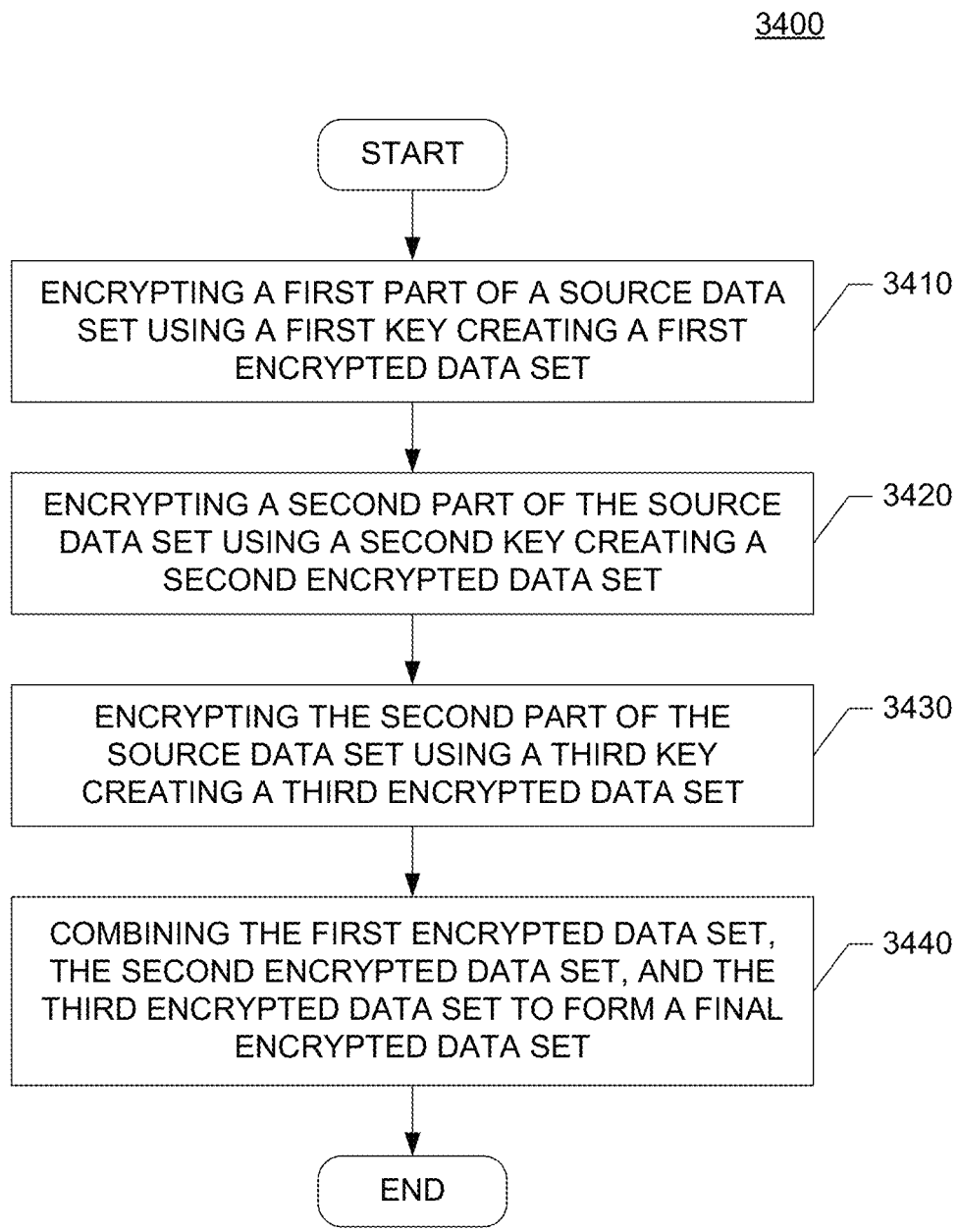
FIG. 34 is a flow diagram illustrating a method for content individualization.

FIG. 34 is a flow diagram illustrating a method 3400 for content individualization. The method 3400 includes: encrypting a first part of a source data set using a first key creating a first encrypted data set, at step 3410; encrypting a second part of the source data set using a second key creating a second encrypted data set, at step 3420; encrypting the second part of the source data set using a third key creating a third encrypted data set, at step 3430; and combining the first encrypted data set, the second encrypted data set, and the third encrypted data set to form a final encrypted data set, at step 3440.

Figure 35:
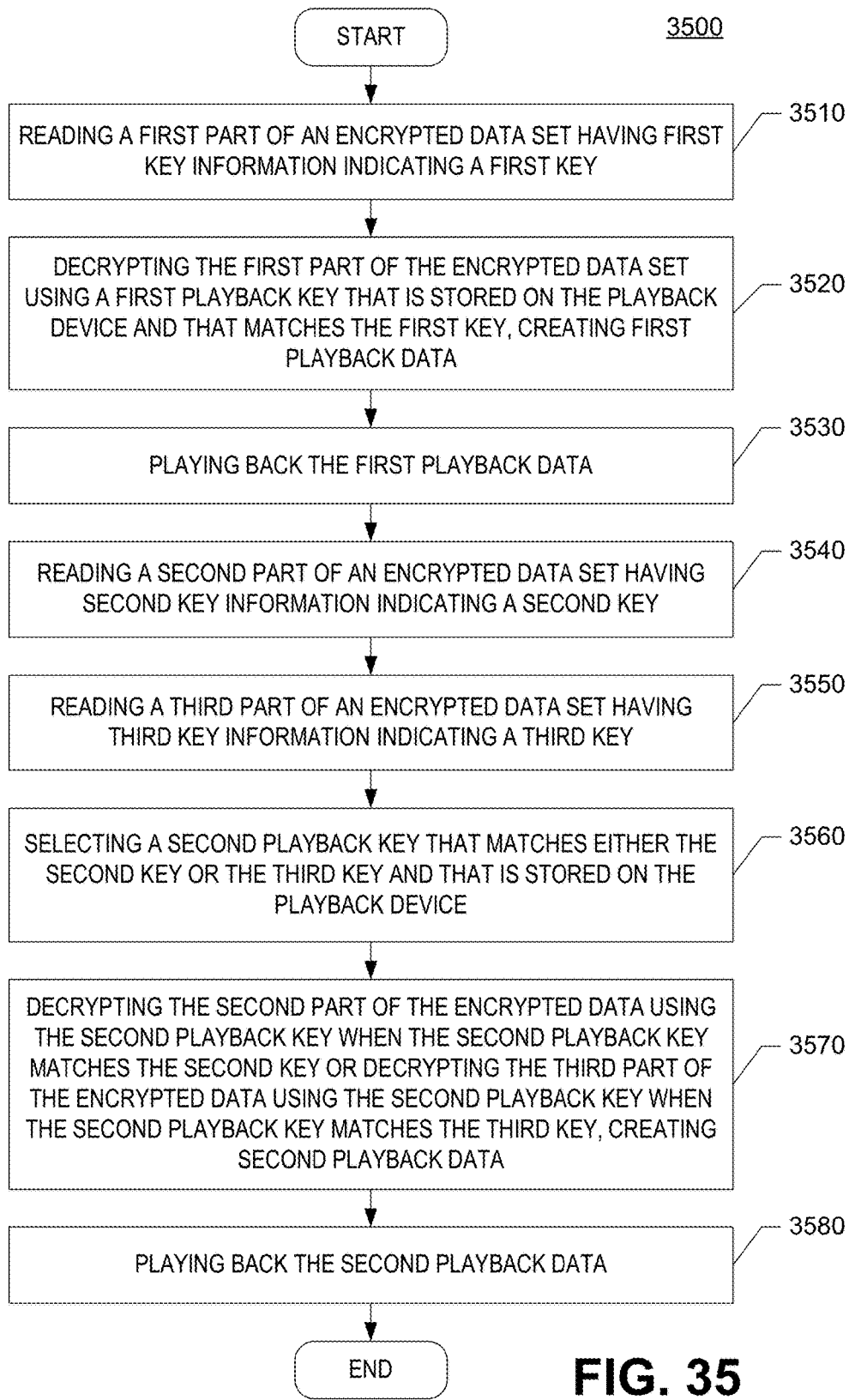
FIG. 35 is a flow diagram illustrating a method of playing back individualized content on a playback device.

FIG. 35 is a flow diagram illustrating a method 3500 of playing back individualized content on a playback device. The method includes: reading a first part of an encrypted data set having first key information indicating a first key, at step 3510; decrypting the first part of the encrypted data set using a first playback key that is stored on the playback device and that matches the first key, creating first playback data, at step 3520; playing back the first playback data, at step 3530; reading a second part of an encrypted data set having second key information indicating a second key, at step 3540; reading a third part of an encrypted data set having third key information indicating a third key, at step 3550; selecting a second playback key that matches either the second key or the third key and that is stored on the playback device, at step 3560; decrypting the second part of the encrypted data using the second playback key when the second playback key matches the second key or decrypting the third part of the encrypted data using the second playback key when the second playback key matches the third key, creating second playback data, at step 3570; and playing back the second playback data, at step 3580.

Figure 36:
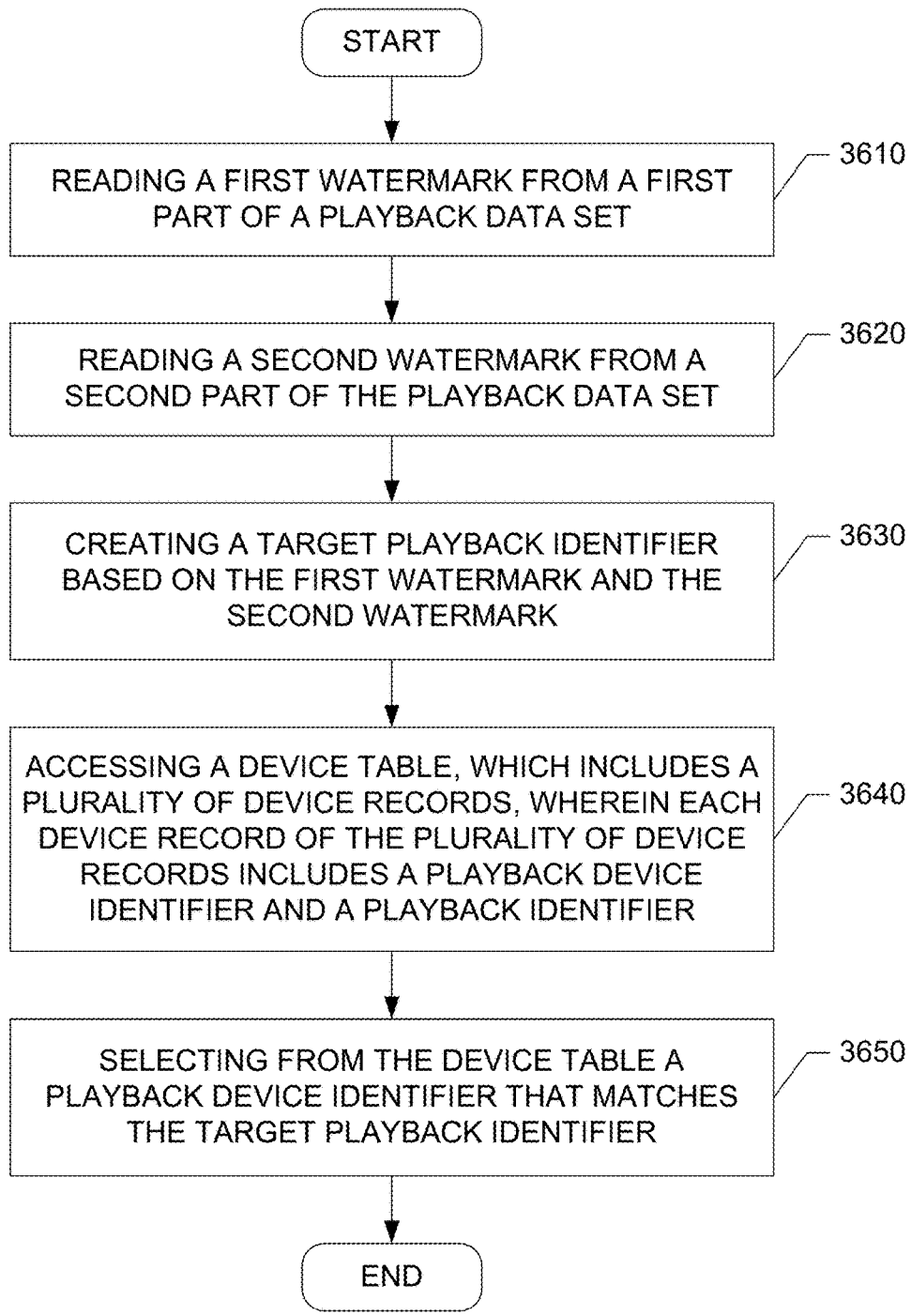
FIG. 36 is a flow diagram illustrating a method of reviewing individualized content.

FIG. 36 is a flow diagram illustrating a method 3600 of reviewing individualized content. The method includes: reading a first watermark from a first part of a playback data set, at step 3610; reading a second watermark from a second part of the playback data set, at step 3620; creating a target playback identifier based on the first watermark and the second watermark, at step 3630; accessing a device table, which includes a plurality of device records, wherein each device record of the plurality of device records includes a playback device identifier and a playback identifier, at step 3640; and selecting from the device table a playback device identifier that matches the target playback identifier, at step 3650.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules.

Additional variations and implementations are also possible. While several examples address content files and data representing video, such as a movie or television program, other data can also be used, such as audio, image data, software, scientific or medical data, etc. In one example, patient medical records are segmented, marked, and encrypted as discussed above. Each recipient has a different set of keys for decrypting the record information (e.g., each doctor, each hospital, each insurance provider, each patient). Similar to tracing piracy, this individualization could help to trace privacy failures or security leaks.

The above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

The invention claimed is:

1. A non-transitory storage medium storing a computer program for content individualization on a playback device by encrypting a source data in parts, the computer program comprising executable instructions that cause a computer to:
   encrypt a first part of the source data set using a first key creating a first encrypted data set including a first watermark;
   encrypt a second part of the source data set using a second key creating a second encrypted data set including a second watermark;
   encrypt the second part of the source data set using a third key creating a third encrypted data set including a third watermark;
   place the second encrypted data set and the third encrypted data set in sequence to enable the playback device to decrypt the first encrypted data set with the first key and either the second encrypted data set or the third encrypted data set with either the second key or the third key,
   wherein encrypting the source data in parts enables the content individualization such that it allows the playback device with the first and second keys to decrypt and use the first and second encrypted data sets including the first and second watermarks, while it allows the playback device with the first and third keys to decrypt and use the first and third encrypted data sets including the first and third watermarks; and
   combine the first encrypted data set, the second encrypted data set, and the third encrypted data set to form a final encrypted data set.

2. The non-transitory storage medium of claim 1, wherein the source data set is a video data file, the first part is data for a first frame of video, and the second part is data for a second frame of video.

3. The non-transitory storage medium of claim 2, wherein the video data file is encrypted on a frame-by-frame basis using the first, second, and third keys.

4. The non-transitory storage medium of claim 2, wherein the video data file is encrypted on a fixed-size packet basis using the first, second, and third keys.

5. The non-transitory storage medium of claim 1, wherein the first part is data for a first packet, and the second part is data for a second packet.

6. The non-transitory storage medium of claim 1, wherein the final encrypted data set includes a forensic watermark.

7. The non-transitory storage medium of claim 1, further comprising
   executable instructions that cause the computer to insert the final encrypted data set into a stream.

8. The non-transitory storage medium of claim 1, wherein the final encrypted data set is in a frame base format.

9. The non-transitory storage medium of claim 8, further comprising
   executable instructions that cause the computer to convert the final encrypted data set from the frame base format to a fixed-size packet format.

10. The non-transitory storage medium of claim 1, wherein the final encrypted data set is in a fixed-size packet format.

11. The non-transitory storage medium of claim 10, further comprising
   executable instructions that cause the computer to convert the final encrypted data set from the fixed-size packet format to a frame base format.

12. The non-transitory storage medium of claim 1, wherein the second encrypted data set and the third encrypted data set are placed next to each other when combining.

* * * * *